United States Patent
Sakoh et al.

(10) Patent No.: US 9,790,322 B2
(45) Date of Patent: Oct. 17, 2017

(54) FLUOROPOLYETHER-CONTAINING POLYMER-MODIFIED SILANE, SURFACE TREATING AGENT, AND TREATED ARTICLE

(71) Applicant: SHIN-ETSU CHEMICAL CO., LTD., Tokyo (JP)

(72) Inventors: Ryusuke Sakoh, Annaka (JP); Takashi Matsuda, Annaka (JP); Yuji Yamane, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/096,432

(22) Filed: Apr. 12, 2016

(65) Prior Publication Data

US 2016/0304665 A1  Oct. 20, 2016

(30) Foreign Application Priority Data

Apr. 20, 2015  (JP) .................. 2015-085708

(51) Int. Cl.
| | |
|---|---|
| *C07F 7/00* | (2006.01) |
| *C08G 65/00* | (2006.01) |
| *C09D 5/00* | (2006.01) |
| *C09D 171/02* | (2006.01) |
| *C08G 65/336* | (2006.01) |

(52) U.S. Cl.
CPC .......... *C08G 65/007* (2013.01); *C08G 65/336* (2013.01); *C09D 5/00* (2013.01); *C09D 171/02* (2013.01); *C08G 2650/48* (2013.01)

(58) Field of Classification Search
CPC ...... C08G 65/007; C08G 65/336; C09D 5/00; C09D 171/02
USPC ........................................................ 556/444
See application file for complete search history.

(56) References Cited

U.S. PATENT DOCUMENTS

| | | | | |
|---|---|---|---|---|
| 8,211,544 | B2 * | 7/2012 | Itami | ..................... C07F 7/1836 428/429 |
| 8,664,421 | B2 | 3/2014 | Itami et al. | |
| 8,900,711 | B2 | 12/2014 | Yamane et al. | |
| 2013/0136928 | A1 | 5/2013 | Yamane et al. | |
| 2013/0303689 | A1 | 11/2013 | Sato et al. | |
| 2014/0363682 | A1 * | 12/2014 | Matsuda | ............... C07F 7/1836 428/429 |

FOREIGN PATENT DOCUMENTS

| | | |
|---|---|---|
| JP | 2008-534696 A | 8/2008 |
| JP | 2008-537557 A | 9/2008 |
| JP | 2012-72272 A | 4/2012 |
| JP | 2012-157856 A | 8/2012 |
| JP | 2013-136833 A | 7/2013 |

* cited by examiner

*Primary Examiner* — Fereydoun G Sajjadi
*Assistant Examiner* — Kofi Adzamli
(74) *Attorney, Agent, or Firm* — Birch, Stewart, Kolasch & Birch, LLP

(57) ABSTRACT

A fluoropolyether-containing polymer-modified silane has general formula (1)

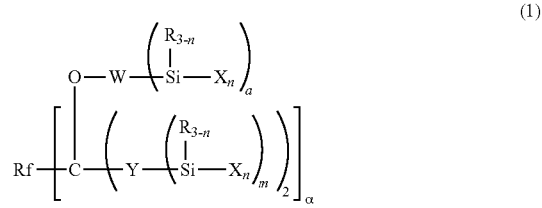

(1)

wherein Rf is a monovalent fluorooxyalkyl or divalent fluorooxyalkylene-containing polymer residue, Y is a divalent to hexavalent hydrocarbon group which may have a silicon atom and/or a siloxane bond, W is a divalent to hexavalent hydrocarbon group which may have a silicon atom and/or a siloxane bond, R is independently an alkyl of 1 to 4 carbon atoms or phenyl, X is independently hydroxyl or a hydrolyzable group, the letters n, a and m are respectively integers from 1 to 3, 1 to 5 and 1 to 5, and α is 1 or 2. A surface treating agent containing this silane and/or a partial (hydrolytic) condensate thereof, when applied to an article, forms a coat of excellent water/oil repellency and abrasion resistance.

6 Claims, No Drawings

FLUOROPOLYETHER-CONTAINING POLYMER-MODIFIED SILANE, SURFACE TREATING AGENT, AND TREATED ARTICLE

CROSS-REFERENCE TO RELATED APPLICATION

This non-provisional application claims priority under 35 U.S.C. §119(a) on Patent Application No. 2015-085708 filed in Japan on Apr. 20, 2015, the entire contents of which are hereby incorporated by reference.

TECHNICAL FIELD

This invention relates to a fluoropolyether-containing polymer-modified silane. More specifically, the invention relates to a silane modified with a fluoropolyether group-containing polymer that forms a film having excellent water and oil repellency and abrasion resistance, a surface treating agent containing the silane and/or a partial (hydrolytic) condensate thereof, and an article that has been surface-treated with the surface treating agent.

BACKGROUND ART

Touch panel technology is rapidly being adopted today in cell-phone displays and other screens for electronic devices. However, a problem with touch panels is that the screen is in an exposed state, creating numerous opportunities for direct contact with the fingers, cheeks, etc. and readily allowing contaminants such as skin oils to adhere. To improve appearance and visibility, there has been a growing need for ways in which to make it harder for users to leave fingerprints on the surface of a display and easier to remove smudges, leading to a desire for new materials that can address such demands. In particular, because fingerprints readily form on touch panel displays, it is desired that a water/oil repellent coat be provided on the display. Unfortunately, conventional water/oil repellent coats have a high water and oil repellency and excellent contaminant wipeability, but the anti-smudging performance diminishes during use.

Fluoropolyether group-containing compounds have a very low surface free energy, and thus generally possess such attributes as water and oil repellency, chemical resistance, lubricity, parting properties and anti-smudging properties. These qualities are widely used industrially in, for example, water/oil-repellent stain-proofing agents for paper and textiles, lubricants for magnetic recording media, oil-proofing agents for precision machinery, parting agents, cosmetics and protective coats. However, these same qualities also manifest as non-tackiness and non-adherence to other substrate materials. Therefore, even when such compounds can be applied to the surface of a substrate, inducing the resulting coat to adhere to the substrate has been a challenge.

Of related interest here are silane coupling agents, which are familiar as substances that bond together substrate surfaces such as glass or fabric with organic compounds and are widely used as coatings for various types of substrate surfaces. Silane coupling agents have an organic functional group and a reactive silyl group (generally a hydrolyzable silyl group such as an alkoxysilyl group) on the same molecule. The hydrolyzable silyl group gives rise to a self-condensing reaction due in part to moisture in the air, forming a film. The hydrolyzable silyl groups in this film bond chemically and physically with the surface of the glass, metal or the like, resulting in a strong and durable coat.

JP-A 2008-534696, JP-A 2008-537557, JP-A 2012-072272, JP-A 2012-157856 and JP-A 2013-136833 disclose compositions which, by making use of a fluoropolyether-containing polymer-modified silane obtained by introducing a hydrolyzable silyl group onto a fluoropolyether group-containing compound, are able to form a coat that readily adheres to a substrate surface and imparts the surface of the substrate with water and oil repellency, chemical resistance, lubricity, parting properties and anti-smudging properties.

The cured film on a lens or anti-reflective coating that has been surface-treated with such a composition containing a fluoropolyether-containing polymer-modified silane obtained by introducing a hydrolyzable silyl group onto a fluoropolyether-containing compound has excellent lubricity and parting properties. However, cured films produced by a wet coating process such as spray coating or dip coating are unable to demonstrate sufficient abrasion resistance compared with cured films produced by vapor deposition.

CITATION LIST

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833

DISCLOSURE OF INVENTION

It is therefore an object of this invention to provide a fluoropolyether-containing polymer-modified silane which can form a cured film having excellent water and oil repellency and abrasion resistance, a surface treating agent containing this silane and/or a partial (hydrolytic) condensate thereof, and an article that has been surface-treated with the surface treating agent.

The inventors have discovered that, by using the subsequently described fluoropolyether-containing polymer-modified silane of general formula (1), surface treating agents containing this silane and/or a partial (hydrolytic) condensate thereof are able to form a cured film having excellent water and oil repellency and abrasion resistance.

Accordingly, in one aspect, the invention provides a fluoropolyether-containing polymer-modified silane having general formula (1)

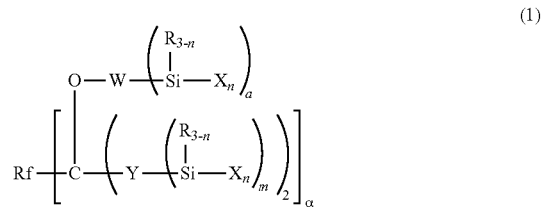

wherein Rf is a monovalent fluorooxyalkyl or divalent fluorooxyalkylene-containing polymer residue, Y is a divalent to hexavalent hydrocarbon group which may have a silicon atom and/or a siloxane bond, W is a divalent to hexavalent hydrocarbon group which may have a silicon atom and/or a siloxane bond, R is independently an alkyl group of 1 to 4 carbon atoms or a phenyl group, X is independently a hydroxyl group or a hydrolyzable group, n is an integer from 1 to 3, a is an integer from 1 to 5, m is an integer from 1 to 5, and α is 1 or 2.

In one preferred embodiment, α in formula (1) is 1 and Rf is a moiety of general formula (2)

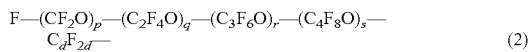
$$F-(CF_2O)_p-(C_2F_4O)_q-(C_3F_6O)_r-(C_4F_8O)_s-C_dF_{2d}- \qquad (2)$$

wherein p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ unit may be linear or branched.

In another preferred embodiment, α in formula (1) is 2 and Rf is a moiety of general formula (3)

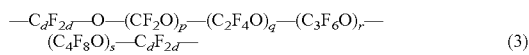
$$-C_dF_{2d}-O-(CF_2O)_p-(C_2F_4O)_q-(C_3F_6O)_r-(C_4F_8O)_s-C_dF_{2d}- \qquad (3)$$

wherein p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ units may be linear or branched.

In formula (1), Y is preferably selected from the group consisting of alkylene groups of 3 to 10 carbon atoms, alkylene groups of 2 to 8 carbon atoms containing an arylene group of 6 to 8 carbon atoms, divalent groups having alkylene groups of 2 to 8 carbon atoms bonded to each other via a $C_1$-$C_4$ silalkylene or $C_6$-$C_{10}$ silarylene structure, and divalent to tetravalent groups having an alkylene group of 2 to 10 carbon atoms bonded at a valence position on a divalent to tetravalent organopolysiloxane residue that is linear and has 2 to 10 silicon atoms or is branched or cyclic and has 3 to 10 silicon atoms.

In formula (1), W is preferably selected from the group consisting of alkylene groups of 2 to 10 carbon atoms, alkylene groups of 2 to 8 carbon atoms containing an arylene group of 6 to 8 carbon atoms, alkylene groups of 2 to 6 carbon atoms containing a diorganosilylene group, divalent groups having alkylene groups of 2 to 8 carbon atoms bonded to each other via a $C_1$-$C_4$ silalkylene or $C_6$-$C_{10}$ silarylene structure, and divalent to tetravalent groups having an alkylene group of 2 to 10 carbon atoms bonded at a valence position on a divalent to tetravalent organopolysiloxane residue that is linear and has 2 to 10 silicon atoms or is branched or cyclic and has 3 to 10 silicon atoms.

In formula (1), each X may be independently selected from the group consisting of hydroxyl, alkoxy groups of 1 to 10 carbon atoms, alkoxyalkoxy groups of 2 to 10 carbon atoms, acyloxy groups of 1 to 10 carbon atoms, alkenyloxy groups of 2 to 10 carbon atoms, and halogen groups.

Preferred fluoropolyether-containing polymer-modified silane include those of the following formulas:

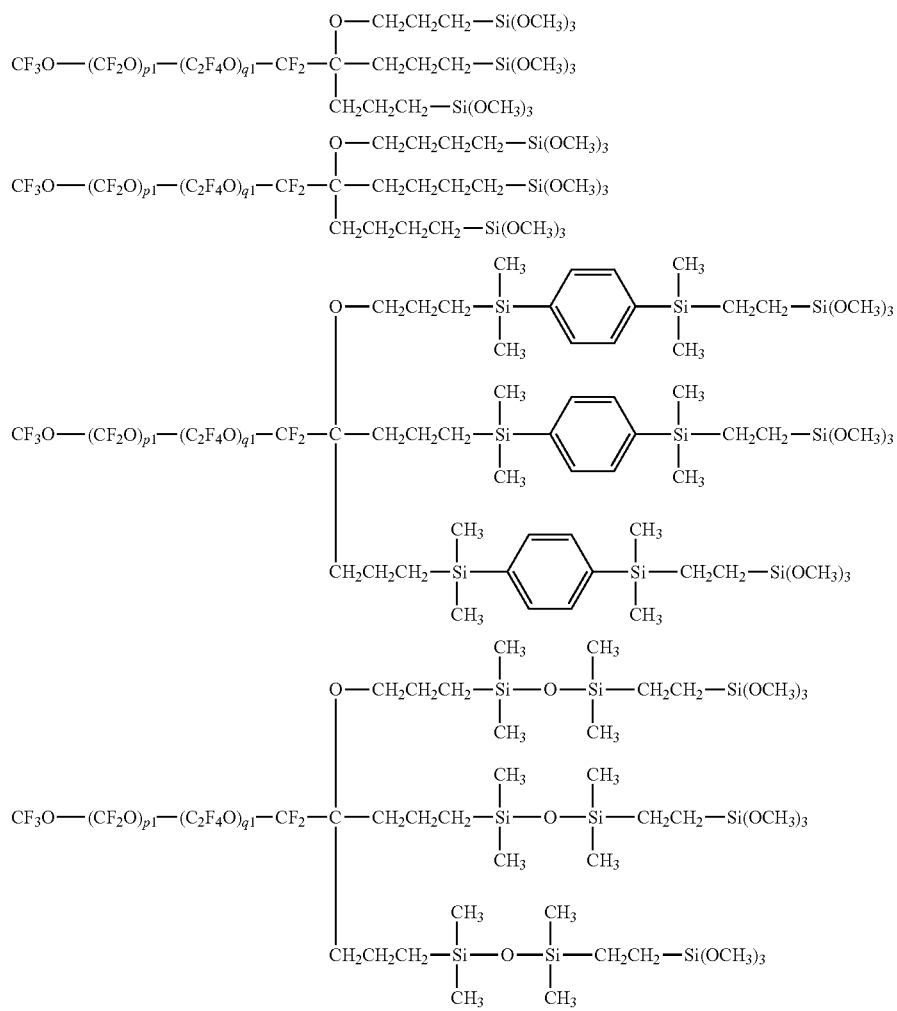

-continued

wherein p1 is an integer from 5 to 100, q1 is an integer from 5 to 100, and the sum p1+q1 is an integer from 10 to 105.

In another aspect, the invention provides a surface treating agent comprising the polymer-modified silane and/or a partial (hydrolytic) condensate thereof.

In yet another aspect, the invention provides an article that is surface-treated with the foregoing surface treating agent.

Advantageous Effects of the Invention

The fluoropolyether-containing polymer-modified silane according to the invention has an improved substrate adhesion owing to the large number of functional groups thereon. As a result, articles that are surface-treated with a surface treating agent containing this polymer-modified silane and/or a partial (hydrolytic) condensate thereof have excellent water/oil repellency and abrasion resistance.

DESCRIPTION OF THE PREFERRED EMBODIMENTS

The objects, features and advantages of the invention will become more apparent from the following detailed description.

The fluoropolyether-containing polymer-modified silane of the invention has general formula (1) below.

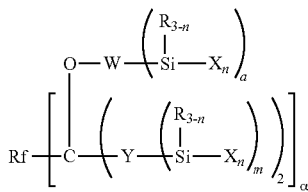

(1)

In formula (1), Rf is a monovalent fluorooxyalkyl or divalent fluorooxyalkylene-containing polymer residue, Y is a divalent to hexavalent hydrocarbon group which may have a silicon atom and/or a siloxane bond, W is a divalent to hexavalent hydrocarbon group which may have a silicon atom and/or a siloxane bond, R is independently an alkyl group of 1 to 4 carbon atoms or a phenyl group, X is independently a hydroxyl group or a hydrolyzable group, n is an integer from 1 to 3, a is an integer from 1 to 5, m is an integer from 1 to 5, and α is 1 or 2.

The silane of the invention is a silane modified with a fluoropolyether group-containing polymer and is characterized by having a structure in which a monovalent fluorooxyalkyl or divalent fluorooxyalkylene-containing polymer residue (Rf) is bonded with hydrolyzable silyl groups such as alkoxysilyl or hydroxyl-containing silyl groups (—Si(R)$_{3-n}$(X)$_n$) via hydrocarbon chains Y and W. The presence of three or more reactive functional groups on the polymer endows the silane with improved substrate adhesion and excellent wear resistance.

When α is 1, Rf is preferably a monovalent fluorooxyalkyl group of general formula (2) below.

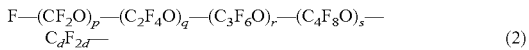

(2)

Here, p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ unit may be linear or branched.

When α is 2, Rf is preferably a divalent fluorooxyalkylene group of general formula (3) below.

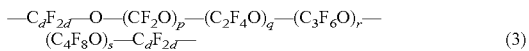

(3)

Here, p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ units may be linear or branched.

In formulas (2) and (3), p, q, r and s are each integers from 0 to 200. Preferably, p is an integer from 5 to 100, q is an integer from 5 to 100, r is an integer from 0 to 100, and s is an integer from 0 to 100. The sum p+q+r+s=3 to 200, and preferably 10 to 100. Each recurring unit may be linear or branched, and individual recurring units may be randomly arranged. More preferably, the sum p+q is an integer from 10 to 105, especially from 15 to 60, and r=s=0. Having the sum p+q+r+s be smaller than this upper limit value is desirable because the adhesion and curability are good, and having this sum be larger than the lower limit value is desirable because the characteristics of the fluoropolyether groups can be fully exhibited.

In formulas (2) and (3), d is an integer from 1 to 3, and is preferably 1 or 2. The $C_dF_{2d}$ units may be linear or branched.

Illustrative examples of Rf include the following.

F(CF$_2$O)$_p$CF$_2$—
F(CF$_2$O)$_p$(CF$_2$CF$_2$O)$_q$CF$_2$—
F(CF$_2$O)$_p$(CF$_2$CF$_2$O)$_q$(CF$_2$CF$_2$CF$_2$O)$_r$CF$_2$—
F(CF$_2$O)$_p$(CF$_2$CF$_2$O)$_q$(CF$_2$CF$_2$CF$_2$CF$_2$O)$_s$CF$_2$—
F(CF$_2$O)$_p$(CF$_2$CF$_2$O)$_q$(CF$_2$CF$_2$CF$_2$O)$_{r'}$
(CF$_2$CF$_2$CF$_2$CF$_2$O)$_{s'}$CF$_2$—
F(CF$_2$CF$_2$O)$_q$CF$_2$—

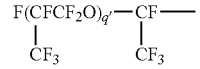

—CF$_2$O(CF$_2$O)$_p$CF$_2$—
—CF$_2$O(CF$_2$O)$_p$(CF$_2$CF$_2$O)$_q$CF$_2$—
—CF$_2$O(CF$_2$O)$_p$(CF$_2$CF$_2$O)$_q$(CF$_2$CF$_2$CF$_2$O)$_r$CF$_2$—
—CF$_2$O(CF$_2$O)$_p$(CF$_2$CF$_2$O)$_q$(CF$_2$CF$_2$CF$_2$CF$_2$O)$_s$CF$_2$—
—CF$_2$O(CF$_2$O)$_p$(CF$_2$CF$_2$O)$_q$(CF$_2$CF$_2$CF$_2$O)$_{r'}$
(CF$_2$CF$_2$CF$_2$CF$_2$O)$_{s'}$CF$_2$—
—CF$_2$CF$_2$O(CF$_2$CF$_2$CF$_2$O)$_r$CF$_2$CF$_2$—

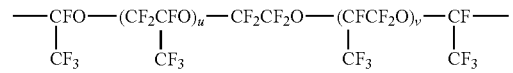

Here, p', q', r' and s' are each an integer of 1 or more and have upper limits that are the same as the upper limits indicated above for, respectively, p, q, r and s. In addition, u is an integer from 1 to 24, and v is an integer from 1 to 24. Individual recurring units may be randomly arranged.

In formula (1), Y is a divalent to hexavalent, preferably divalent to tetravalent, and more preferably divalent, hydrocarbon group which may have a silicon atom and/or a siloxane bond. The absence on the molecule of low bonding energy linkages (such as ether bonds) enables a coat of excellent abrasion resistance to be provided.

Illustrative examples of Y include alkylene groups of 3 to 10 carbon atoms, such as propylene (trimethylene, methylethylene), butylene (tetramethylene, methylpropylene) and hexamethylene; alkylene groups of 2 to 8 carbon atoms containing an arylene group of 6 to 8 carbon atoms such as phenylene (e.g., alkylene-arylene groups of 8 to 16 carbon atoms); divalent groups having alkylene groups of 2 to 8 carbon atoms bonded to each other via a $C_1$-$C_4$ silalkylene or $C_6$-$C_{10}$ silarylene structure; and divalent to hexavalent groups having an alkylene group of 2 to 10 carbon atoms bonded at a valence position on a divalent to hexavalent organopolysiloxane residue that is linear, branched or cyclic and has 2 to 10, preferably 2 to 5, silicon atoms. Preferred examples include alkylene groups of 3 to 10 carbon atoms; phenylene-containing alkylene groups of 2 to 6 carbon atoms; divalent groups having alkylene groups of 2 to 4 carbon atoms bonded to each other via a $C_1$-$C_4$ silalkylene or $C_6$-$C_{10}$ silarylene structure; and divalent to tetravalent groups having an alkylene group of 2 to 10 carbon atoms bonded at a valence position on a divalent to tetravalent organopolysiloxane residue that is linear and has 2 to 10 silicon atoms or is branched or cyclic and has 3 to 10 silicon atoms. Alkylene groups of 3 to 6 carbon atoms are even more preferred.

The silalkylene structure and silarylene structure are exemplified by the following structure.

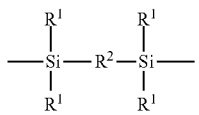

Here, each $R^1$, which may be the same or different, is an alkyl group of 1 to 4 carbon atoms, such as methyl, ethyl, propyl or butyl, or an aryl group of 6 to 10 carbon atoms, such as phenyl. $R^2$ is an alkylene group of 1 to 4 carbon atoms, such as methylene, ethylene, propylene (trimethylene, methylethylene), or an arylene group of 6 to 10 carbons, such as phenylene.

The divalent to hexavalent organopolysiloxane residue that is linear, branched or cyclic and has 2 to 10, preferably 2 to 5 silicon atoms is exemplified as shown below.

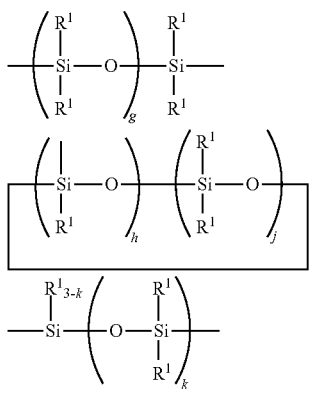

Here, $R^1$ is as defined above, g is an integer from 1 to 9, preferably from 1 to 4, h is an integer from 2 to 6, preferably from 2 to 4, j is an integer from 0 to 8, preferably 0 or 1, the sum h+j is an integer from 3 to 10, preferably from 3 to 5, and k is an integer from 1 to 3, preferably 2 or 3.

Illustrative examples of Y include the following groups.

—CH$_2$CH$_2$CH$_2$—
—CH$_2$CH$_2$CH$_2$CH$_2$—
—CH$_2$CH$_2$CH$_2$CH$_2$CH$_2$—
—CH$_2$CH$_2$CH$_2$CH$_2$CH$_2$CH$_2$—

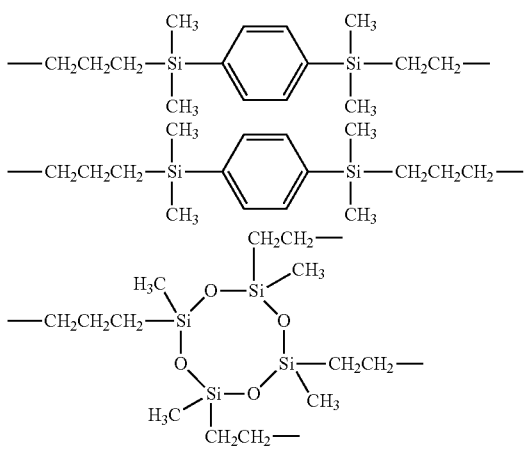

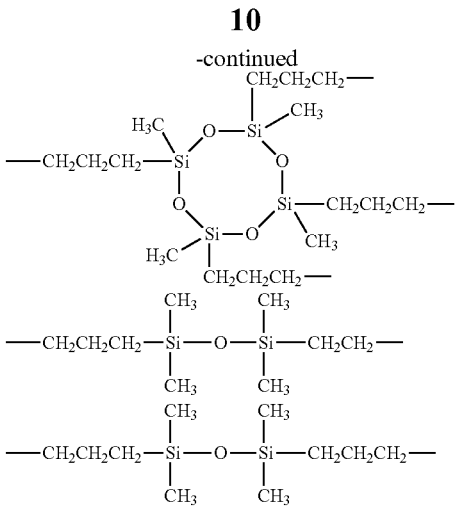

In formula (1), W is a divalent to hexavalent, preferably divalent to tetravalent, and more preferably divalent, hydrocarbon group, and may have a silicon atom and/or a siloxane bond.

Illustrative examples of W include alkylene groups of 2 to 10 carbon atoms, such as ethylene, propylene (trimethylene, methylethylene), butylene (tetramethylene, methylpropylene) and hexamethylene; alkylene groups of 2 to 8 carbon atoms containing an arylene group of 6 to 8 carbon atoms such as phenylene (e.g., alkylene-arylene groups of 8 to 16 carbon atoms); alkylene groups of 2 to 6 carbon atoms which contain a diorganosilylene group such as dimethylsilylene or diethylsilylene; divalent groups having alkylene groups of 2 to 8 carbon atoms bonded to each other via a $C_1$-$C_4$ silalkylene or $C_6$-$C_{10}$ silarylene structure; alkylene groups of 2 to 6 carbon atoms having a divalent to hexavalent organopolysiloxane residue that is linear, branched or cyclic and has 2 to 10, preferably 2 to 5 silicon atoms; and divalent to hexavalent groups having an alkylene group of 2 to 10 carbon atoms bonded at a valence position on a divalent to hexavalent organopolysiloxane residue that is linear, branched or cyclic and has 2 to 10, preferably 2 to 5 silicon atoms. Preferred examples include alkylene groups of 3 to 10 carbon atoms; alkylene groups of 2 to 6 carbon atoms containing phenylene group; alkylene groups of 2 to 6 carbon atoms that include a dimethylsilylene group; divalent groups having alkylene groups of 2 to 4 carbon atoms bonded to each other via a $C_1$-$C_4$ silalkylene or $C_6$-$C_{10}$ silarylene structure; alkylene groups of 2 to 6 carbon atoms which include a linear divalent organopolysiloxane residue of 2 to 10 silicon atoms; and divalent to tetravalent groups having an alkylene group of 2 to 10 carbon atoms bonded at a valence position on a divalent to tetravalent organopolysiloxane residue that is linear and has 2 to 10 silicon atoms or is branched or cyclic and has 3 to 10 silicon atoms. Alkylene groups of 3 to 6 carbon atoms are even more preferred.

The silalkylene structure, silarylene structure, and divalent to hexavalent organopolysiloxane residues that are linear, branched or cyclic and have 2 to 10, preferably 2 to 5, silicon atoms are exemplified in the same way as above.

Examples of W include the following groups.

—CH$_2$CH$_2$—
—CH$_2$CH$_2$CH$_2$—
—CH$_2$CH$_2$CH$_2$CH$_2$—
—CH$_2$CH$_2$CH$_2$CH$_2$CH$_2$—
—CH$_2$CH$_2$CH$_2$CH$_2$CH$_2$CH$_2$—

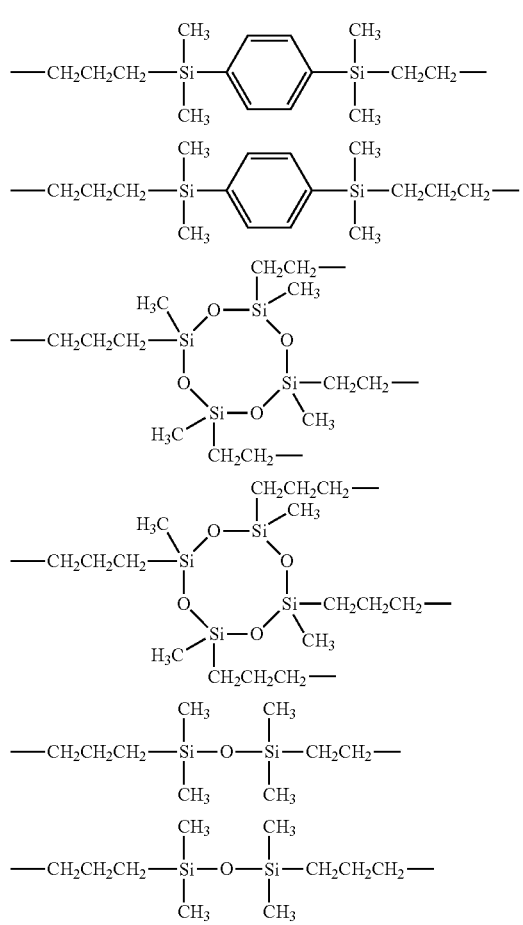
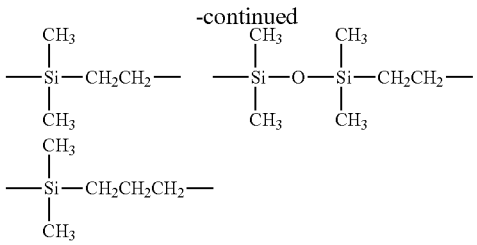

In formula (1), each X is independently a hydroxyl group or a hydrolyzable group. Illustrative examples of X include hydroxyl; alkoxy groups of 1 to 10 carbon atoms such as methoxy, ethoxy, propoxy, isopropoxy and butoxy; alkoxyalkoxy groups of 2 to 10 carbon atoms such as methoxymethoxy and methoxyethoxy; acyloxy groups of 1 to 10 carbon atoms such as acetoxy; alkenyloxy groups of 2 to 10 carbon atoms such as isopropenoxy; and halogen groups such as chloro, bromo and iodo. Of these, methoxy, ethoxy, isopropenoxy and chloro are preferred.

In formula (1), R is an alkyl group of 1 to 4 carbon atoms, such as methyl, ethyl, propyl or butyl, of which methyl is preferred. Also, n is an integer from 1 to 3, and is preferably 2 or 3. From the standpoint of reactivity and adhesion to the substrate, n is more preferably 3.

The subscripts "a" and "m" are each integers from 1 to 5. At less than 1, adhesion to the substrate decreases, whereas at 6 or more, the terminal alkoxy number becomes too high, adversely affecting the performance. Hence, a and m are each preferably an integer from 1 to 3, and most preferably 1.

Examples of the fluoropolyether-containing polymer-modified silane of formula (1) are shown below. In each of these formulas, the number of repetitions (degree of polymerization) for each type of recurring unit making up the fluorooxyalkyl or fluorooxyalkylene group may be any number that satisfies above formulas (2) and (3).

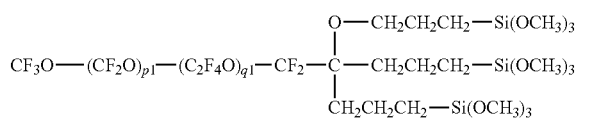
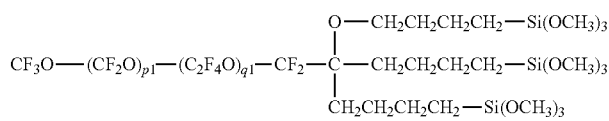
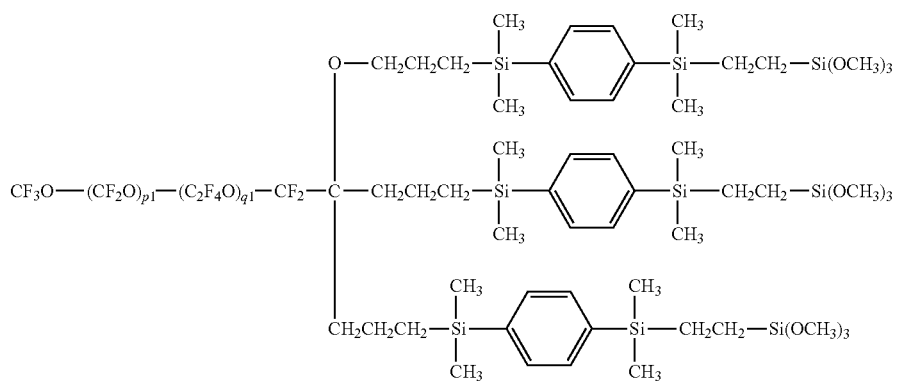

-continued
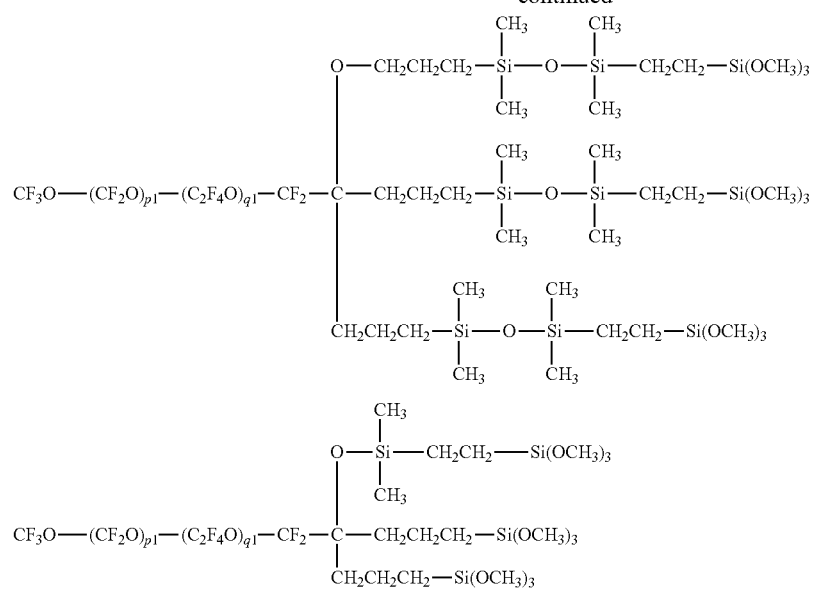
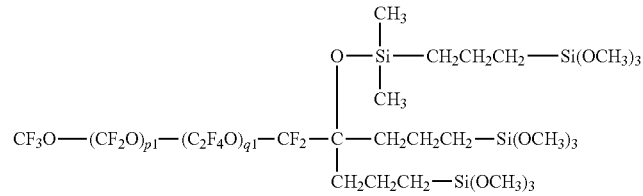
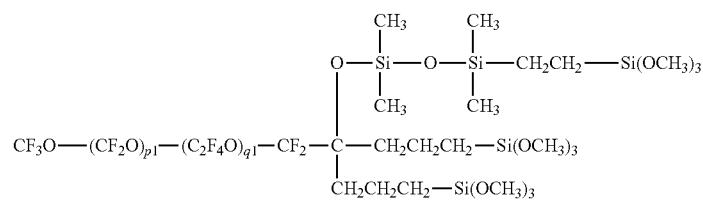
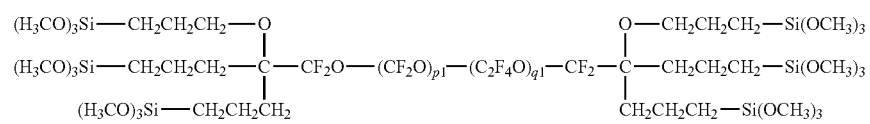
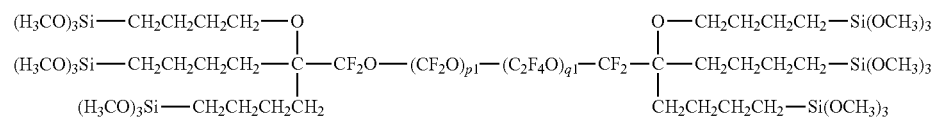
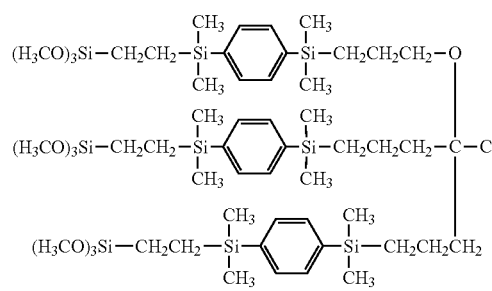
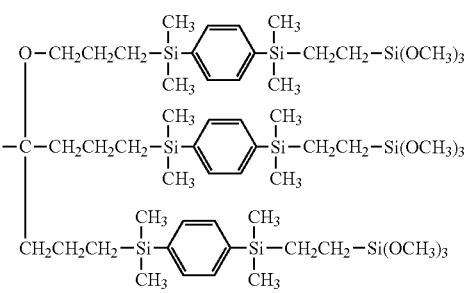

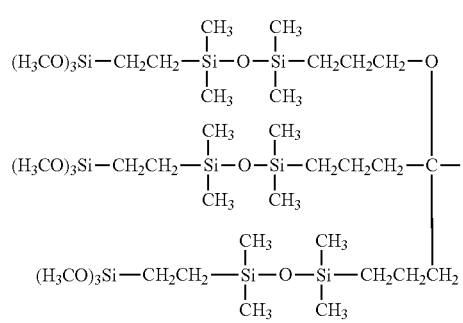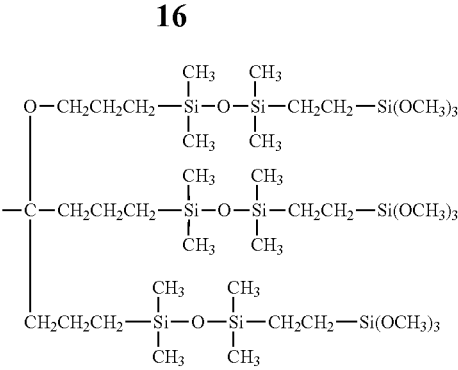

Here, p1 is an integer from 5 to 100, q1 is an integer from 5 to 100, and the sum p1+q1 is an integer from 10 to 105.

The fluoropolyether-containing polymer-modified silane of formula (1) wherein α in formula (1) is 1 may be prepared by, for example, the following methods.

In one exemplary method, a fluorooxyalkyl-containing polymer having three or more olefin sites at one end of the molecular chain is dissolved in a solvent, typically a fluorocarbon solvent such as 1,3-bis(trifluoromethyl)benzene. An organosilicon compound having a SiH group and a hydrolyzable end group on the molecule, such as trimethoxysilane, is added to the solution and the reaction mixture is aged in the presence of a hydrosilylation catalyst, such as toluene solution of chloroplatinic acid/vinylsiloxane complex, at a temperature of 40 to 120° C., preferably 60 to 100° C., and more preferably about 80° C., for 1 to 72 hours, preferably 20 to 36 hours, and more preferably about 24 hours.

In another method for preparing the fluoropolyether-containing polymer-modified silane of formula (1) wherein α in formula (1) is 1, a fluorooxyalkyl-containing polymer having three or more olefin sites on one end of the molecular chain is dissolved in a solvent, typically a fluorocarbon solvent such as 1,3-bis(trifluoromethyl)benzene. An organosilicon compound having a SiH group and a hydrolyzable end group on the molecule, such as trichlorosilane, is added to the solution and the reaction mixture is aged in the presence of a hydrosilylation catalyst, such as a toluene solution of chloroplatinic acid/vinylsiloxane complex, at a temperature of 40 to 120° C., preferably 60 to 100° C., and more preferably about 80° C., for 1 to 72 hours, preferably 20 to 36 hours, and more preferably about 24 hours. The substituent on the silyl group is then converted to a methoxy group, for example.

A SiH group-containing organosilicon compound without a hydrolyzable end group may be used instead of the organosilicon compound having a SiH group and a hydrolyzable end group on the molecule. In this case, an organosilicon compound having two or more SiH groups and no hydrolyzable end groups on the molecule is used as the organosilicon compound. As in the above methods, a fluorooxyalkyl-containing polymer having three or more olefin sites at one end of the molecular chain is reacted with the organosilicon compound having two or more SiH groups and no hydrolyzable end groups on the molecule, following which a mixture of the polymer having terminal SiH groups obtained as the reaction product with an organosilicon compound having an olefin site and a hydrolyzable end group on the molecule, such as allyltrimethoxysilane, is aged in the presence of a hydrosilylation catalyst, such as a toluene solution of chloroplatinic acid/vinylsiloxane complex, at a temperature of 40 to 120° C., preferably 60 to 100° C., and more preferably about 80° C., for 1 to 72 hours, preferably 20 to 36 hours, and more preferably about 24 hours The fluorooxyalkyl-containing polymers having three or more olefin sites at one end of the molecular chain is typically a fluorooxyalkyl-containing polymer of general formula (4) below.

$$Rf-C\genfrac{}{}{0pt}{}{O-(V)_b-CH=CH_2}{(Z-CH=CH_2)_2} \quad (4)$$

Here, Rf is as defined above, Z is a divalent hydrocarbon group, and V is a diorganosilylene group, divalent organosiloxane residue or divalent hydrocarbon group; the hydrocarbon group may include a silicon atom and/or a siloxane bond. The letter b is 0 or 1.

In formula (4), Z is a divalent hydrocarbon group. The divalent hydrocarbon group of 1 to 8, and especially 1 to 4 carbon atoms is preferred. Examples include alkylene groups of 1 to 8 carbon atoms, such as methylene, ethylene, propylene (trimethylene, methylethylene), butylene (tetramethylene, methylpropylene), hexamethylene and octamethylene; and alkylene groups containing an arylene group of 6 to 8 carbon atoms such as phenylene (e.g., alkylene-arylene groups of 7 to 8 carbon atoms). Z is preferably a linear alkylene group of 1 to 4 carbon atoms.

In formula (4), when b is 1, V is a diorganosilylene group, a divalent organosiloxane residue or a divalent hydrocarbon group, and the hydrocarbon group may include a silicon atom and/or a siloxane bond.

Examples of V include divalent hydrocarbon groups of preferably 1 to 14 carbon atoms, and more preferably 1 to 10 carbon atoms, including alkylene groups of 1 to 8 carbon atoms such as methylene, ethylene, propylene (trimethylene, methylethylene), butylene (tetramethylene, methylpropylene), hexamethylene and octamethylene, and alkylene groups containing arylene groups of 6 to 8 carbon atoms such as phenylene (e.g., alkylene-arylene groups of 7 to 14 carbon atoms); alkylene groups of 1 to 4 carbon atoms containing a diorganosilylene group such as dimethylsilylene or diethylsilylene; diorganosilylene groups such as dimethylsilylene or diethylsilylene; and divalent organosiloxane residues of 2 to 10 silicon atoms. V is preferably a linear alkylene group of 1 to 4 carbon atoms, an alkylene group of 1 to 4 carbon atoms containing a dimethylsilylene group, a dimethylsilylene group or a tetramethyldisiloxane residue.

The divalent organopolysiloxane residue is exemplified by residues of the following formula.

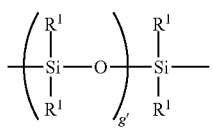

Here, R¹ is as defined above. The subscript g' is an integer from 1 to 9, and preferably 1 to 3.

Examples of V include the following groups.

—CH₂—
—CH₂CH₂—
—CH₂CH₂CH₂—
—CH₂CH₂CH₂CH₂—

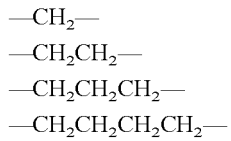

Preferred examples of the fluorooxyalkyl-containing polymer of formula (4) include those of the formulas shown below. The number of repetitions (degree of polymerization) for each type of recurring unit making up the fluorooxyalkyl group in the respective formulas may be any number that satisfies formula (2) for Rf.

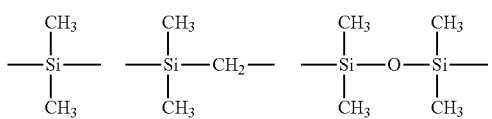

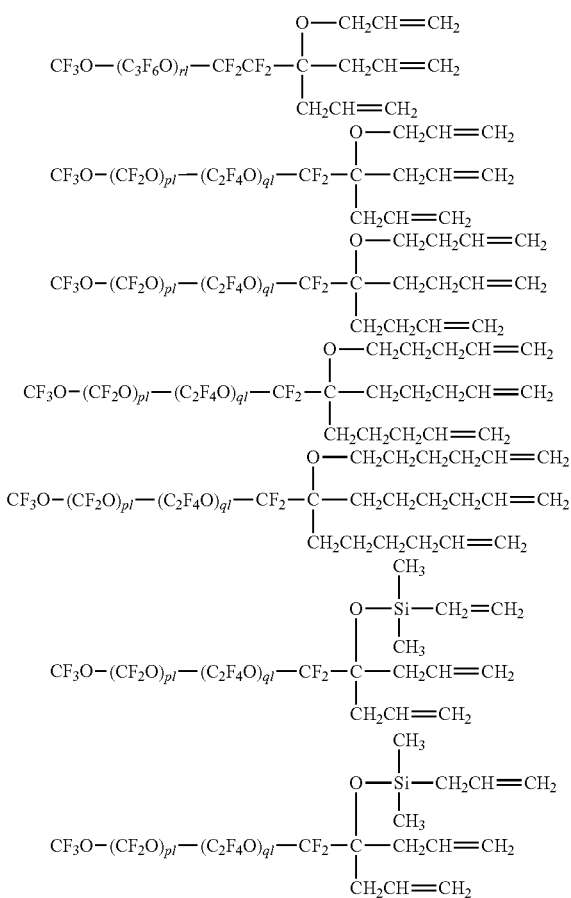

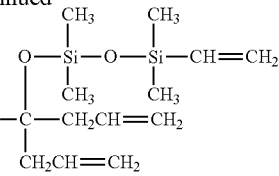

Here, r1 is an integer from 1 to 100, and p1, q1 and the sum p1+q1 are as defined above.

The fluorooxyalkyl-containing polymer of formula (4) may be prepared by, for example, mixing a fluorooxyalkyl-containing polymer having a hydroxyl group at one end of the molecular chain with an olefin introducing compound, and aging the mixture in the presence of a base, with the optional use of an additive or solvent to improve reactivity, at a temperature of 0 to 90° C., preferably 60 to 80° C., and more preferably about 70° C., for 1 to 25 hours, preferably 3 to 10 hours, and more preferably about 6 hours.

In another method for preparing the fluorooxyalkyl-containing polymer of formula (4), a dehydrogenation reaction is carried out between a fluorooxyalkyl-containing polymer having a hydroxyl group at one end of the molecular chain and an olefin-containing hydrosilane or hydrosiloxane in the presence of a dehydrogenation catalyst, and optionally using a solvent, at a temperature of 0 to 60° C., preferably 15 to 35° C., and more preferably about 25° C., for 10 to 24 hours, preferably 30 minutes to 2 hours, and more preferably about 1 hour.

Examples of the fluorooxyalkyl-containing polymer having a hydroxyl group at one end of the molecular chain that is used to prepare the fluorooxyalkyl-containing polymer of formula (4) include those shown below.

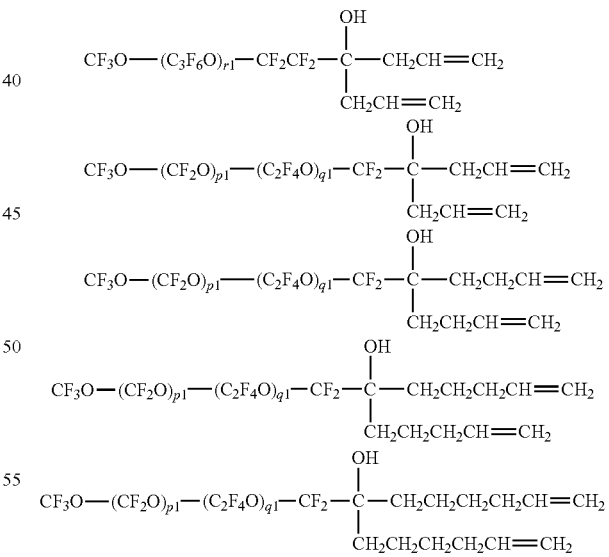

Here, r1, p1, q1 and the sum p1+q1 are as defined above.

The fluorooxyalkyl-containing polymer having a hydroxyl group at one end of the molecular chain may be prepared by, for example, a method in which a perfluorooxyalkyl-containing polymer having an acid fluoride group (—C(=O)—F) at one end of the molecular chain is mixed with a Grignard reagent as a nucleophilic reagent and a solvent such as 1,3-bis(trifluoromethyl)benzene or tetrahydrofuran, and aged at a temperature of 0 to 80° C., preferably 50 to 70° C., and more preferably about 60° C., for 1 to 6 hours, preferably 3 to 5 hours, and more preferably about 4 hours.

Aside from the acid fluoride mentioned above, other groups such as acid halides, acid anhydrides, esters, carboxylic acids and amides may also be used as the group on one end of the molecular chain in the perfluorooxyalkyl-containing polymer.

Examples of perfluorooxyalkyl-containing polymers having such groups at one end of the molecular chain are shown below.

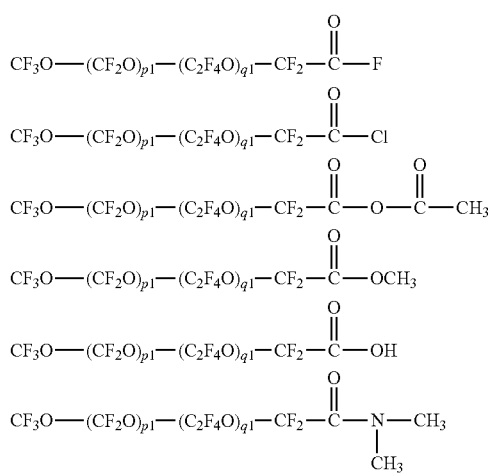

Here, p1, q1 and the sum p1+q1 are as defined above.

Examples of nucleophilic reagents that may be used to prepare the fluorooxyalkyl-containing polymer having a hydroxyl group at one end of the molecular chain include allylmagnesium halides, 3-butenylmagnesium halides, 4-pentenylmagnesium halides and 5-hexenylmagnesium halides. Use of the corresponding lithium reagents is also possible.

The nucleophilic reagent may be used in an amount of preferably 2 to 5 equivalents, more preferably 2.5 to 3.5 equivalents, and even more preferably about 3 equivalents, per equivalent of reactive end groups on the perfluorooxyalkyl-containing polymer.

Examples of solvents that may be used to prepare the fluorooxyalkyl-containing polymer having a hydroxyl group at one end of the molecular chain include the following fluorocarbon solvents: 1,3-bis(trifluoromethyl)benzene, trifluomethylbenzene, hydrofluoroether (HFE) solvents (available as the Novec™ series from the 3M Co.) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of completely fluorinated compounds (available as the Fluorinert™ series from the 3M Co.). Other organic solvents that may be used include ether solvents such as tetrahydrofuran (THF), monoethylene glycol dimethyl ether, diethylene glycol dimethyl ether, triethylene glycol dimethyl ether, tetraethylene glycol dimethyl ether and dioxane.

The solvent may be used in an amount of 10 to 300 parts by weight, preferably 100 to 200 parts by weight, and more preferably about 150 parts by weight, per 100 parts by weight of the perfluorooxyalkyl-containing polymer.

Next, the reaction is stopped and the reaction mixture is separated into a water layer and a fluorocarbon solvent layer by a separatory operation. The fluorocarbon solvent layer thus obtained is again washed with an organic solvent and the solvents are removed by distillation, giving a fluorooxyalkyl-containing polymer having a hydroxyl group at one end of the molecular chain.

Examples of the olefin introducing compound that may be used to prepare the fluorooxyalkyl-containing polymer of formula (4) include allyl halides such as allyl chloride, allyl bromide and allyl iodide, and also 4-chloro-1-butene, 4-bromo-1-butene, 4-iodo-1-butene, 5-chloro-1-pentene, 5-bromo-1-pentene and 5-iodo-1-pentene.

The olefin introducing compound may be used in an amount of preferably 1 to 10 equivalents, more preferably 2.5 to 6 equivalents, and even more preferably about 5 equivalents, per equivalent of reactive end groups on the fluorooxyalkyl-containing polymer having a hydroxyl group at one end of the molecular chain.

The base that may be used to prepare the fluorooxyalkyl-containing polymer of formula (4) is exemplified by amines and alkali metal bases. Examples of amines include triethylamine, diisopropylethylamine, pyridine, DBU and imidazole. Examples of alkali metal bases include sodium hydroxide, potassium hydroxide, sodium hydride, potassium hydride, alkyllithiums, t-butoxy potassium, lithium diisopropylamide, lithium bis(trimethylsilyl)amide, sodium bis(trimethylsilyl)amide and potassium bis(trimethylsilyl)amide.

The base may be used in an amount of preferably 1 to 10 equivalents, more preferably 4 to 6 equivalents, and even more preferably about 5 equivalents, per equivalent of reactive end groups on the fluorooxyalkyl-containing polymer having a hydroxyl group at one end of the molecular chain.

When preparing the fluorooxyalkyl-containing polymer of formula (4), tetrabutylammonium halides, alkali metal halides and the like may be used as additives to increase the reactivity. Examples of such additives include tetrabutylammonium chloride, tetrabutylammonium bromide, tetrabutylammonium iodide, tetrabutylammonium, tetrabutylammonium hydrogensulfate, sodium iodide, potassium iodide, cesium iodide, and also crown ethers. These additives increase the reactivity by catalytic halogen exchange with the olefin introducing compound in the reaction system, and crown ethers increase the reactivity by coordination to the metal.

Such additives may be used in an amount of preferably 0.005 to 0.1 equivalent, more preferably 0.01 to 0.05 equivalent, and even more preferably about 0.02 equivalent, per equivalent of reactive end groups on the fluorooxyalkyl-containing polymer having a hydroxyl group at one end of the molecular chain.

A solvent may be used to prepare the fluorooxyalkyl-containing polymer of formula (4). The use of a solvent is not absolutely essential, but examples of solvents that may be used include the following fluorocarbon solvents: fluorine-containing aromatic hydrocarbon solvents such as 1,3-bis(trifluoromethyl)benzene and trifluoromethylbenzene, hydrofluoroether (HFE) solvents (available as the Novec™ series from the 3M Co.) such as 1,1,1,2,3,4,4,5,5,5-decafluoro-3-methoxy-2-(trifluoromethyl)-pentane, and perfluorosolvents composed of completely fluorinated compounds (available as the Fluorinert™ series from the 3M Co.). In addition, organic solvents that may be used include dimethylformamide, dimethylacetamide, dimethylsulfoxide, acetonitrile and THF.

When a solvent is used, the solvent may be used in an amount of 10 to 300 parts by weight, preferably 30 to 150 parts by weight, and more preferably about 50 parts by weight, per 100 parts by weight of the fluorooxyalkyl-containing polymer having a hydroxyl group at one end of the molecular chain.

Examples of olefin-containing hydrosilanes and hydrosiloxanes that may be used to prepare the fluorooxyalkyl-containing polymer of formula (4) include hydrosilanes such as dimethylvinylsilane, dimethylallylsilane, diethylvinylsilane and diethylallylsilane; and hydrosiloxanes such as vinyltetramethyldisiloxane, allyltetramethyldisiloxane, vinyltetraethyldisiloxane, allyltetraethyldisiloxane, vinyltetraphenyldisiloxane, allyltetraphenyldisiloxane, vinylhexamethyltrisiloxane and allylhexamethyltrisiloxane.

An olefin-containing hydrosilane or hydrosiloxane may be used in an amount of preferably 1 to 5 equivalents, more preferably 1.5 to 3 equivalents, and even more preferably about 2 equivalents, per equivalent of reactive end groups on the fluorooxyalkyl-containing polymer having a hydroxyl group at one end of the molecular chain.

Dehydrogenation catalysts that may be used in preparing the fluorooxyalkyl-containing polymer of formula (4) are exemplified by rhodium, palladium, ruthenium and other platinum group metal-based catalysts, and boron catalysts. Examples include platinum group metal-based catalysts such as tetrakis(triphenylphosphine)palladium and chlorotris(triphenylphosphine)rhodium, and boron catalysts such as tris(pentafluorophenyl)borane.

The dehydrogenation catalyst may be used in an amount of preferably 0.01 to 0.0005 equivalent, more preferably 0.007 to 0.001 equivalent, and even more preferably about 0.005 equivalent, per equivalent of reactive end groups on the fluorooxyalkyl-containing polymer having a hydroxyl group at one end of the molecular chain.

Next, the reaction is stopped and the reaction mixture is separated into a water layer and a fluorocarbon solvent layer by a separatory operation. The fluorocarbon solvent layer thus obtained is again washed with an organic solvent and the solvents are removed by distillation, giving a fluorooxyalkyl-containing polymer of formula (4).

In preparing a fluoropolyether-containing polymer-modified silane of formula (1) in which α is 1, the solvent used is preferably a fluorocarbon solvent. Illustrative examples of fluorocarbon solvents include 1,3-bis(trifluoromethyl)benzene, trifluomethylbenzene, hydrofluoroether (HFE) solvents (available as the Novec™ series from the 3M Co.) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of completely fluorinated compounds (available as the Fluorinert™ series from the 3M Co.).

The solvent may be used in an amount of 10 to 300 parts by weight, preferably 50 to 150 parts by weight, and more preferably about 100 parts by weight, per 100 parts by weight of the perfluorooxyalkyl-containing polymer having three or more olefin sites at one end of the molecular chain.

In preparing a fluoropolyether-containing polymer-modified silane of formula (1) in which α is 1, the organosilicon compound having a SiH group and a hydrolyzable end group on the molecule is preferably a compound of any of general formulas (5) to (8) below.

(5)

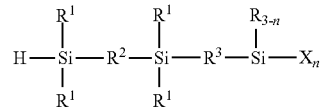

(6)

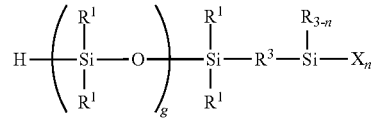

(7)

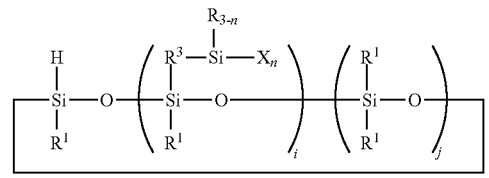

(8)

Here, R, X, n, $R^1$, $R^2$, g and j are as defined above. $R^3$ is a divalent hydrocarbon group of 2 to 8 carbon atoms, i is an integer from 2 to 9, preferably 2 to 4, and the sum i+j is an integer from 2 to 9.

Examples of the divalent hydrocarbon group $R^3$ of 2 to 8, preferably 2 or 3, carbon atoms include alkylene groups such as methylene, ethylene, propylene (trimethylene, methylethylene), butylene (tetramethylene, methylpropylene), hexamethylene and octamethylene; arylene groups such as phenylene; and combinations of two or more of these groups (e.g., alkylene-arylene groups). Of these, ethylene and trimethylene are preferred.

Examples of such organosilicon compounds having a SiH group and a hydrolyzable end group on the molecule include trimethoxysilane, triethoxysilane, tripropoxysilane, triisopropoxysilane, tributoxysilane, triisopropenoxysilane, triacetoxysilane, trichlorosilane, tribromosilane, triiodosilane, and silanes such as the following.

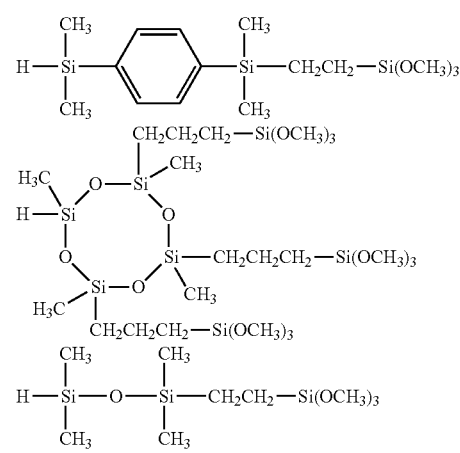

In the preparation of a fluoropolyether-containing polymer-modified silane of formula (1) in which α is 1, when reacting a fluorooxyalkyl-containing polymer having three or more olefin sites at one end of the molecular chain with a organosilicon compound having a SiH group and a hydrolyzable end group on the molecule, the organosilicon compound having a SiH group and a hydrolyzable end group on the molecule is used in an amount of preferably 3 to 9 equivalents, more preferably 5 to 7 equivalents, and even more preferably about 6 equivalents, per equivalent of reactive end groups on the fluorooxyalkyl-containing polymer having three or more olefin sites at one end of the molecular chain.

In the preparation of a fluoropolyether-containing polymer-modified silane of formula (1) in which α is 1, the organosilicon compound having two or more SiH groups and no hydrolyzable end groups on the molecule is preferably a compound of any of general formulas (9) to (11) below.

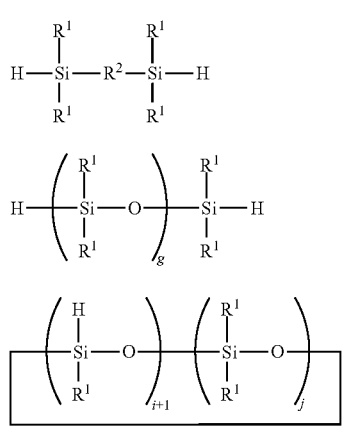

Here, $R^1$, $R^2$, g, j and i are as defined above.

Examples of the organosilicon compound having two or more SiH groups and no hydrolyzable end groups on the molecule include those shown below.

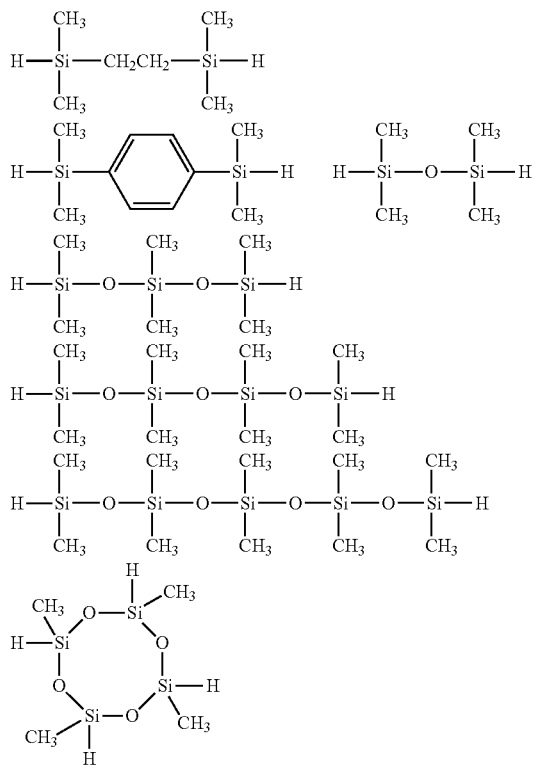

In the preparation of a fluoropolyether-containing polymer-modified silane of formula (1) in which α is 1, when reacting a fluorooxyalkyl-containing polymer having three or more olefin sites at one end of the molecular chain with a organosilicon compound having two or more SiH groups and no hydrolyzable end group on the molecule, the organosilicon compound having two or more SiH groups and no hydrolyzable end group on the molecule is used in an amount of preferably 7 to 30 equivalents, more preferably 10 to 20 equivalents, and even more preferably about 15 equivalents, per equivalent of reactive end groups on the fluorooxyalkyl-containing polymer having three or more olefin sites at one end of the molecular chain.

In the preparation of a fluoropolyether-containing polymer-modified silane of formula (1) in which α is 1, the organosilicon compound having an olefin site and a hydrolyzable end group on the molecule is preferably a compound of general formula (12) below.

In formula (12), R, X and n are as defined above, and U is a single bond or a divalent hydrocarbon group of 1 to 6 carbon atoms. Examples of the divalent hydrocarbon group of 1 to 6 carbon atoms include alkylene groups such as methylene, ethylene, propylene (trimethylene, methylethylene), butylene (tetramethylene, methylpropylene) and hexamethylene, and also phenylene. U is preferably a single bond or methylene.

In the preparation of a fluoropolyether-containing polymer-modified silane of formula (1) in which α is 1, when reacting an organosilicon compound having an olefin site and a hydrolyzable end group on the molecule with the reaction product of a fluorooxyalkyl group-containing polymer having three or more olefin sites at one end of the molecular chain and a organosilicon compound having two or more SiH groups and no hydrolyzable end group on the molecule, the organosilicon compound having an olefin site and a hydrolyzable end group on the molecule is used in an amount of preferably 3 to 9 equivalents, more preferably 5 to 7 equivalents, and even more preferably about 6 equivalents, per equivalent of reactive end groups on the reaction product of the fluorooxyalkyl-containing polymer having three or more olefin sites at one end of the molecular chain with the organosilicon compound having two or more SiH groups and no hydrolyzable end group on the molecule.

In the preparation of a fluoropolyether-containing polymer-modified silane of formula (1) in which α is 1, the hydrosilylation catalyst is exemplified by platinum group metal-based catalysts such as platinum black, chloroplatinic acid, alcohol-modified chloroplatinic acid, complexes of chloroplatinic acid with, for example, olefins, aldehydes, vinylsiloxane or acetylene alcohols, tetrakis(triphenylphosphine)palladium and chlorotris(triphenylphosphine)rhodium. Platinum compounds such as vinylsiloxane coordination compounds are preferred.

The amount of hydrosilylation catalyst used, based on the transition metal, is preferably 0.1 to 100 ppm, and more preferably 1 to 50 ppm, relative to the weight of the reaction product of the fluorooxyalkyl-containing polymer having three or more olefin sites at one end of the molecular chain with the organosilicon compound having two or more SiH groups and no hydrolyzable end group on the molecule.

The target compound can be subsequently obtained by distilling off the solvents and unreacted reagents under reduced pressure.

For example, by using the compound of the following formula

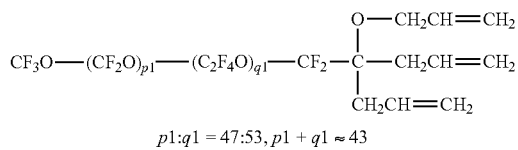

$p1:q1 = 47:53, p1 + q1 \approx 43$ as the fluorooxyalkyl-containing polymer having three or more olefin sites at one end of the molecular chain and using trimethoxysilane as the organosilicon compound having a SiH group and a hydrolyzable end group on the molecule, a compound of the following formula can be obtained.

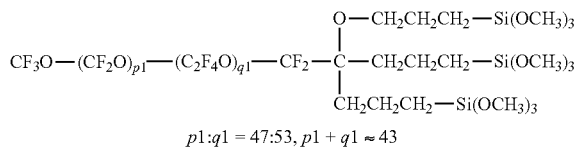

$p1:q1 = 47:53, p1 + q1 \approx 43$

The fluoropolyether-containing polymer-modified silane of formula (1) wherein α in formula (1) is 2 may be prepared by, for example, the following methods.

In one exemplary method, a fluorooxyalkylene-containing polymer having at least three olefin sites each at both ends of the molecular chain is dissolved in a solvent, typically a fluorocarbon solvent such as 1,3-bis(trifluoromethyl)benzene. An organosilicon compound having a SiH group and a hydrolyzable end group on the molecule, such as trimethoxysilane, is added to the solution and the reaction mixture is aged in the presence of a hydrosilylation catalyst, such as a toluene solution of chloroplatinic acid/vinylsiloxane complex, at a temperature of 40 to 120° C., preferably 60 to 100° C., and more preferably about 80° C., for 1 to 72 hours, preferably 20 to 36 hours, and more preferably about 24 hours.

Alternatively, an organosilicon compound having SiH groups and no hydrolyzable end group may be used instead of an organosilicon compound having a SiH group and a hydrolyzable end group on the molecule. In this case, an organosilicon compound having two or more SiH groups and no hydrolyzable end group on the molecule is used as the organosilicon compound. Here, as in the foregoing method, a fluorooxyalkylene-containing polymer having at least three olefin sites each at both ends of the molecular chain is reacted with an organosilicon compound having two or more SiH groups and no hydrolyzable end groups on the molecule, following which a mixture of the polymer having terminal SiH groups obtained as the reaction product with an organosilicon compound having an olefin site and a hydrolyzable end group on the molecule, such as allyltrimethoxysilane, is aged in the presence of a hydrosilylation reaction catalyst, such as a toluene solution of a chloroplatinic acid/vinylsiloxane complex, at a temperature of 40 to 120° C., preferably 60 to 100° C., and more preferably about 80° C., for 1 to 72 hours, preferably 20 to 36 hours, and more preferably about 24 hours.

The fluorooxyalkylene-containing polymer having at least three olefin sites each at both ends of the molecular chain is typically a fluorooxyalkylene-containing polymer of general formula (13) below.

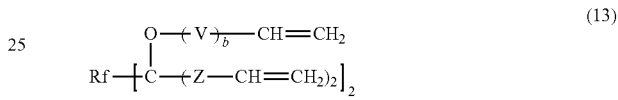

Here, Rf, Z, V and b are as defined below.

Preferred examples of the fluorooxyalkylene-containing polymer of general formula (13) are shown below. The number of repetitions (degree of polymerization) for each type of recurring unit making up the fluorooxyalkylene group in the respective formulas may be any number that satisfies formula (3) for Rf.

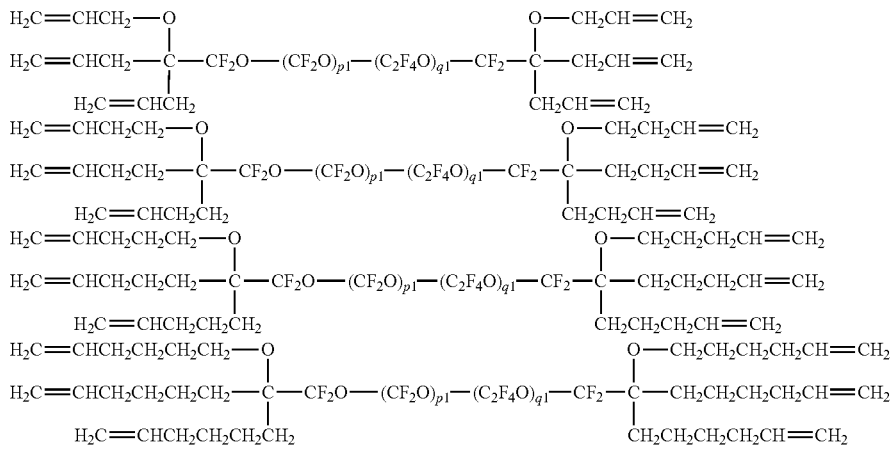

Here, p1, q1 and the sum p1+q1 are as defined above.

The fluorooxyalkylene-containing polymer of formula (13) may be prepared by, for example, mixing a fluorooxyalkylene-containing polymer having hydroxyl groups at both ends of the molecular chain with an olefin introducing compound, and aging the mixture in the presence of a base, with the optional use of an additive or solvent to improve reactivity, at a temperature of 0 to 90° C., preferably 60 to 80° C., and more preferably about 70° C., for 1 to 25 hours, preferably 3 to 10 hours, and more preferably about 6 hours.

In another method for preparing the fluorooxyalkylene-containing polymer of formula (13), a dehydrogenation reaction is carried out between a fluorooxyalkylene-containing polymer having hydroxyl groups at both ends of the molecular chain and an olefin-containing hydrosilane or hydrosiloxane in the presence of a dehydrogenation catalyst, and optionally using a solvent, at a temperature of 0 to 60° C., preferably 15 to 35° C., and more preferably about 25° C., for 10 to 24 hours, preferably 30 minutes to 2 hours, and more preferably about 1 hour.

Examples of the fluorooxyalkylene-containing polymer having hydroxyl groups at both ends of the molecular chain that may be used to prepare the fluorooxyalkylene-containing polymer of formula (13) include those shown below.

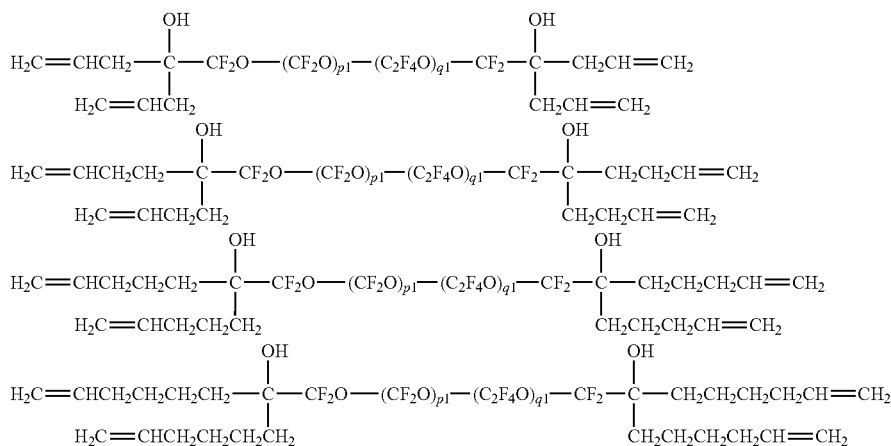

Here, p1, q1 and the sum p1+q1 are as defined above.

The fluorooxyalkylene-containing polymer having hydroxyl groups at both ends of the molecular chain may be prepared by, for example, a method in which a perfluorooxyalkylene-containing polymer having acid fluoride groups (—C(=O)—F) at both ends of the molecular chain is mixed with a Grignard reagent as a nucleophilic reagent and a solvent such as 1,3-bis(trifluoromethyl)benzene or tetrahydrofuran, and aged at a temperature of 0 to 80° C., preferably 50 to 70° C., and more preferably about 60° C., for 1 to 6 hours, preferably 3 to 5 hours, and more preferably about 4 hours.

Aside from the acid fluoride mentioned above, other groups such as acid halides, acid anhydrides, esters, carboxylic acids and amides may also be used as the groups on both ends of the molecular chain in the perfluorooxyalkylene-containing polymer.

Examples of perfluorooxyalkylene-containing polymers having these groups at both ends of the molecular chain are shown below.

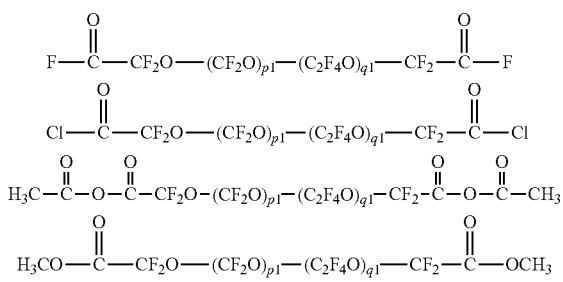

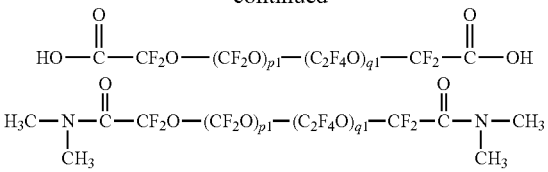

Here, p1, q1 and the sum p1+q1 are as defined above.

Examples of nucleophilic reagents that may be used to prepare the fluorooxyalkylene-containing polymer having hydroxyl groups at both ends of the molecular chain include allylmagnesium halides, 3-butenylmagnesium halides, 4-pentenylmagnesium halides and 5-hexenylmagnesium halides. Use of the corresponding lithium reagents is also possible.

The nucleophilic reagent may be used in an amount of preferably 4 to 10 equivalents, more preferably 5 to 7 equivalents, and even more preferably about 6 equivalents, per equivalent of reactive end groups on the perfluorooxyalkylene-containing polymer.

Examples of solvents that may be used to prepare the fluorooxyalkylene-containing polymer having hydroxyl groups at both ends of the molecular chain include the following fluorocarbon solvents: 1,3-bis(trifluoromethyl)benzene, trifluomethylbenzene, hydrofluoroether (HFE) solvents (available as the Novec™ series from the 3M Co.) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoro-methyl)pentane, and perfluoro solvents composed of completely fluorinated compounds (available as the Fluorinert™ series from the 3M Co.). Other organic solvents that may be used include ether solvents such as tetrahydrofuran (THF), monoethylene glycol dimethyl ether, diethylene glycol dimethyl ether, triethylene glycol dimethyl ether, tetraethylene glycol dimethyl ether and dioxane.

The solvent may be used in an amount of 10 to 300 parts by weight, preferably 100 to 200 parts by weight, and more preferably about 150 parts by weight, per 100 parts by weight of the perfluorooxyalkylene-containing polymer.

Next, the reaction is stopped and the reaction mixture is separated into a water layer and a fluorocarbon solvent layer by a reparatory operation. The fluorocarbon solvent layer thus obtained is again washed with an organic solvent and the solvents are removed by distillation, giving a fluorooxyalkylene-containing polymer having hydroxyl groups at both ends of the molecular chain.

Examples of the olefin introduction compound that may be used to prepare the fluorooxyalkylene-containing polymer of formula (13) include allyl halides such as allyl chloride, allyl bromide and allyl iodide, and also 4-chloro-1-butene, 4-bromo-1-butene, 4-iodo-1-butene, 5-chloro-1-pentene, 5-bromo-1-pentene and 5-iodo-1-pentene.

The olefin introducing compound may be used in an amount of preferably 1 to 10 equivalents, more preferably 2.5 to 6 equivalents, and even more preferably about 5 equivalents, per equivalent of reactive end groups on the fluorooxyalkylene-containing polymer having hydroxyl groups at both ends of the molecular chain.

The base that may be used to prepare the fluorooxyalkylene-containing polymer of formula (13) is exemplified by amines and alkali metal bases. Examples of amines include triethylamine, diisopropylethylamine, pyridine, DBU and imidazole. Examples of alkali metal bases include sodium hydroxide, potassium hydroxide, sodium hydride, potassium hydride, alkyllithiums, t-butoxy potassium, lithium diisopropylamide, lithium bis(trimethylsilyl)amide, sodium bis(trimethylsilyl)amide and potassium bis(trimethylsilyl)amide.

The base may be used in an amount of preferably 1 to 10 equivalents, more preferably 4 to 6 equivalents, and even more preferably about 5 equivalents, per equivalent of reactive end groups on the fluorooxyalkyl-containing polymer having hydroxyl groups at both ends of the molecular chain.

When preparing the fluorooxyalkylene-containing polymer of formula (13), tetrabutylammonium halides, alkali metal halides and the like may be used as additives to increase the reactivity. Examples of such additives include tetrabutylammonium chloride, tetrabutylammonium bromide, tetrabutylammonium iodide, tetrabutylammonium, tetrabutylammonium hydrogensulfate, sodium iodide, potassium iodide, cesium iodide, and also crown ethers. These additives increase the reactivity by catalytic halogen exchange with the olefin introducing compound in the reaction system, and crown ethers increase the reactivity by coordination to the metal.

Such additives may be used in an amount of preferably 0.005 to 0.1 equivalent, more preferably 0.01 to 0.05 equivalent, and even more preferably about 0.02 equivalent, per equivalent of reactive end groups on the fluorooxyalkylene-containing polymer having hydroxyl groups at both ends of the molecular chain.

A solvent may be used to prepare the fluorooxyalkylene-containing polymer of formula (13). The use of a solvent is not absolutely essential, but examples of solvents that may be used include the following fluorocarbon solvents: fluorine-containing aromatic hydrocarbon solvents such as 1,3-bis(trifluoromethyl)benzene and trifluoromethylbenzene, hydrofluoroether (HFE) solvents (available as the Novec™ series from the 3M Co.) such as 1,1,1,2,3,4,4,5,5,5-decafluoro-3-methoxy-2-(trifluoromethyl)-pentane, and perfluorosolvents composed of completely fluorinated compounds (available as the Fluorinert™ series from the 3M Co.). In addition, organic solvents that may be used include dimethylformamide, dimethylacetamide, dimethylsulfoxide, acetonitrile and THF.

When a solvent is used, the solvent may be used in an amount of from 10 to 300 parts by weight, preferably 30 to 150 parts by weight, and more preferably about 50 parts by weight, per 100 parts by weight of the fluorooxyalkylene-containing polymer having hydroxyl groups at both ends of the molecular chain.

Examples of olefin-containing hydrosilanes and hydrosiloxanes that may be used to prepare the fluorooxyalkylene-containing polymer of formula (13) include hydrosilanes such as dimethylvinylsilane, dimethylallylsilane, diethylvinylsilane and diethylallylsilane; and hydrosiloxanes such as vinyltetramethyldisiloxane, allyltetramethyldisiloxane, vinyltetraethyldisiloxane, allyltetraethyldisiloxane, vinyltetraphenyldisiloxane, allyltetraphenyldisiloxane, vinylhexamethyltrisiloxane and allylhexamethyltrisiloxane.

An olefin-containing hydrosilane or hydrosiloxane may be used in an amount of preferably 1 to 5 equivalents, more preferably 1.5 to 3 equivalents, and even more preferably about 2 equivalents, per equivalent of reactive end groups on the fluorooxyalkylene-containing polymer having hydroxyl groups at both ends of the molecular chain.

Dehydrogenation catalysts that may be used in preparing the fluorooxyalkylene-containing polymer of formula (13) are exemplified by rhodium, palladium, ruthenium and other platinum group metal-based catalysts, and boron catalysts. Examples include platinum group metal-based catalysts such as tetrakis(triphenylphosphine)palladium and chlorotris(triphenylphosphine)rhodium, and boron catalysts such as tris(pentafluorophenyl)borane.

The dehydrogenation catalyst may be used in an amount of preferably 0.01 to 0.0005 equivalent, more preferably 0.007 to 0.001 equivalent, and even more preferably about 0.005 equivalent, per equivalent of reactive end groups on the fluorooxyalkylene-containing polymer having hydroxyl groups at both ends of the molecular chain.

Next, the reaction is stopped and the reaction mixture is separated into a water layer and a fluorocarbon solvent layer by a separatory operation. The fluorocarbon solvent layer thus obtained is again washed with an organic solvent and the solvents are removed by distillation, giving a fluorooxyalkylene-containing polymer of formula (13).

In preparing a fluoropolyether-containing polymer-modified silane of formula (1) in which α is 2, the solvent used is preferably a fluorocarbon solvent. Illustrative examples of fluorocarbon solvents include 1,3-bis(trifluoromethyl)benzene, trifluomethylbenzene, hydrofluoroether (HFE) solvents (available as the Novec™ series from the 3M Co.) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of completely fluorinated compounds (available as the Fluorinert™ series from the 3M Co.).

The solvent may be used in an amount of 10 to 300 parts by weight, preferably 50 to 150 parts by weight, and more preferably about 100 parts by weight, per 100 parts by weight of the perfluorooxyalkylene-containing polymer having three or more olefin sites each at both ends of the molecular chain.

In preparing a fluoropolyether-containing polymer-modified silane of formula (1) in which α is 2, the organosilicon compound having a SiH group and a hydrolyzable end group on the molecule is preferably a compound of any of general formulas (5) to (8) below.

(5)

-continued

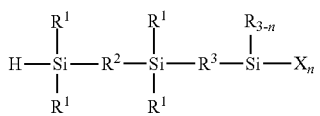  (6)

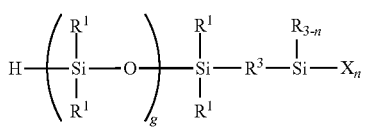  (7)

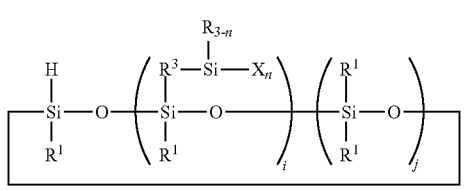  (8)

Here, R, X, n, $R^1$, $R^2$, $R^3$, g, i and j are as defined above.

Examples of such organosilicon compounds having a SiH group and a hydrolyzable end group on the molecule include trimethoxysilane, triethoxysilane, tripropoxysilane, triisopropoxysilane, tributoxysilane, triisopropenoxysilane, triacetoxysilane, trichlorosilane, tribromosilane, triiodosilane, and silanes such as the following.

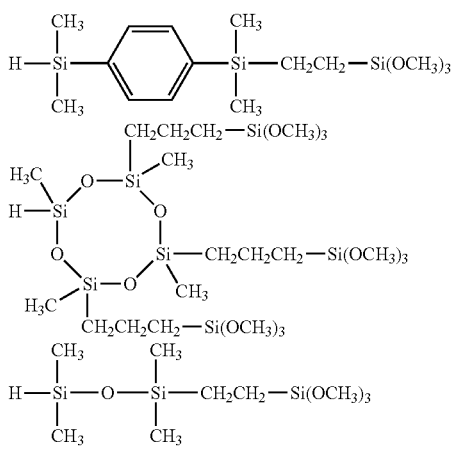

In the preparation of a fluoropolyether-containing polymer-modified silane of formula (1) in which α is 2, when reacting a fluorooxyalkylene-containing polymer having three or more olefin sites each at both ends of the molecular chain with a organosilicon compound having a SiH group and a hydrolyzable end group on the molecule, the organosilicon compound having a SiH group and a hydrolyzable end group on the molecule is used in an amount of preferably 3 to 9 equivalents, more preferably 5 to 7 equivalents, and even more preferably about 6 equivalents, per equivalent of reactive end groups on the fluorooxyalkylene-containing polymer having three or more olefin sites each at both ends of the molecular chain.

In the preparation of a fluoropolyether-containing polymer-modified silane of formula (1) in which α is 2, the organosilicon compound having two or more SiH groups and no hydrolyzable end groups on the molecule is preferably a compound of any of general formulas (9) to (11) below.

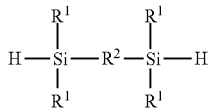  (9)

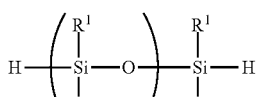  (10)

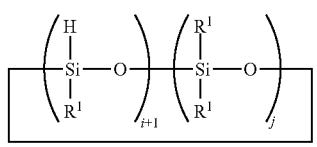  (11)

Here, $R^1$, $R^2$, g, j and i are as defined above.

Examples of the organosilicon compound having two or more SiH groups and no hydrolyzable end groups on the molecule include those shown below.

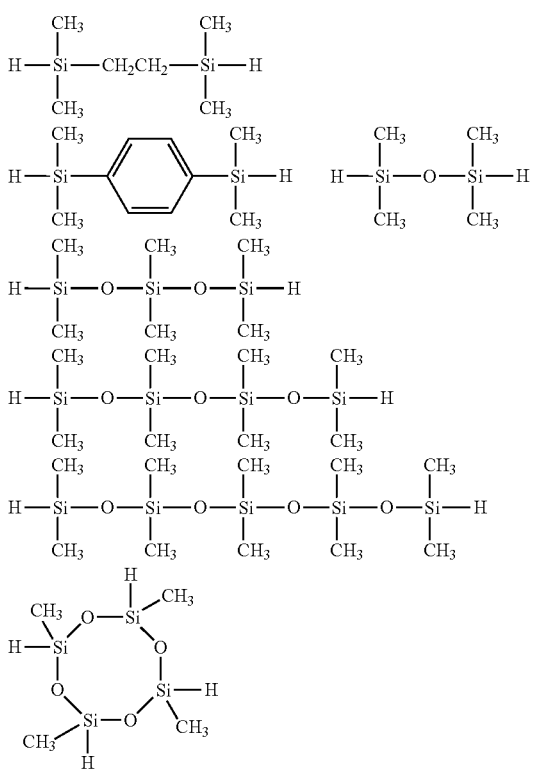

In the preparation of a fluoropolyether-containing polymer-modified silane of formula (1) in which α is 2, when reacting a fluorooxyalkylene-containing polymer having three or more olefin sites each at both ends of the molecular chain with a organosilicon compound having two or more SiH groups and no hydrolyzable end group on the molecule, the organosilicon compound having two or more SiH groups and no hydrolyzable end group on the molecule is used in an amount of preferably 7 to 30 equivalents, more preferably 10 to 20 equivalents, and even more preferably about 15 equivalents, per equivalent of reactive end groups on the fluorooxyalkylene group-containing polymer having three or more olefin sites each at both ends of the molecular chain.

In the preparation of a fluoropolyether-containing polymer-modified silane of formula (1) in which α is 2, the organosilicon compound having an olefin site and a hydrolyzable end group on the molecule is preferably a compound of general formula (12) below.

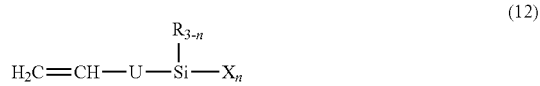
(12)

Here, R, X, U and n are as defined above.

In the preparation of a fluoropolyether-containing polymer-modified silane of formula (1) in which α is 2, when reacting an organosilicon compound having an olefin site and a hydrolyzable end group on the molecule with the reaction product of a fluorooxyalkylene-containing polymer having three or more olefin sites each at both ends of the molecular chain and a organosilicon compound having two or more SiH groups and no hydrolyzable end group on the molecule, the organosilicon compound having an olefin site and a hydrolyzable end group on the molecule is used in an amount of preferably 3 to 9 equivalents, more preferably 5 to 7 equivalents, and even more preferably about 6 equivalents, per equivalent of reactive end groups on the reaction product of the fluorooxyalkylene-containing polymer having three or more olefin sites each at both ends of the molecular chain with the organosilicon compound having two or more SiH groups and no hydrolyzable end group on the molecule.

In the preparation of a fluoropolyether-containing polymer-modified silane of formula (1) in which α is 2, the hydrosilylation catalyst is exemplified by platinum group metal-based catalysts such as platinum black, chloroplatinic acid, alcohol-modified chloroplatinic acid, complexes of chloroplatinic acid with, for example, olefins, aldehydes, vinylsiloxane or acetylene alcohols, tetrakis(triphenylphosphine)palladium and chlorotris(triphenylphosphine)rhodium. Platinum compounds such as vinylsiloxane coordination compounds are preferred.

The amount of hydrosilylation catalyst used, based on the transition metal, is preferably 0.1 to 100 ppm, and more preferably 1 to 50 ppm, relative to the weight of the reaction product of a fluorooxyalkylene-containing polymer having three or more olefin sites each at both ends of the molecular chain with a organosilicon compound having two or more SiH groups and no hydrolyzable end group on the molecule.

The target compound can be subsequently obtained by distilling off the solvents and unreacted reagents under reduced pressure.

For example, by using the compound of the following formula

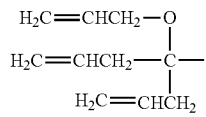 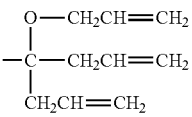

$p1:q1 = 47:53, p1 + q1 \approx 43$ as the fluorooxyalkylene-containing polymer having three or more olefin sites each at both ends of the molecular chain and using trimethoxysilane as the organosilicon compound having a SiH group and a hydrolyzable end group on the molecule, a compound of the following formula can be obtained.

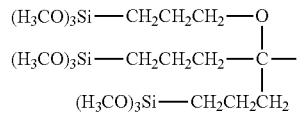 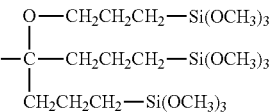

$p1:q1 = 47:53, p1 + q1 \approx 43$

The invention additionally provides a surface treating agent which includes the above fluoropolyether-containing polymer-modified silane. The surface treating agent may include a partial (hydrolytic) condensate obtained by the condensation of hydroxyl groups on the fluoropolyether-containing polymer-modified silane, or of hydroxyl groups formed by using a known method to carry out in advance the partial hydrolysis of terminal hydrolyzable groups on the fluoropolyether-containing polymer-modified silane.

Where necessary, a hydrolysis/condensation catalyst may be added to the surface treating agent. Examples of such catalysts include organotin compounds (e.g., dibutyltin dimethoxide, dibutyltin dilaurate), organotitanium compounds (e.g., tetra-n-butyl titanate), organic acids (e.g., acetic acid, methanesulfonic acid, fluorine-modified carboxylic acids), and inorganic acids (e.g., hydrochloric acid, sulfuric acid). Of these, acetic acid, tetra-n-butyl titanate, dibutyltin dilaurate and fluorine-modified carboxylic acids are especially preferred.

The amount of the hydrolysis/condensation catalyst added per 100 parts by weight of the fluoropolyether-containing polymer-modified silane and/or a partial (hydrolytic) condensate thereof is typically 0.01 to 5 parts by weight, and preferably 0.1 to 1 part by weight.

The surface treating agent may include a suitable solvent. Examples of such solvents include fluorine-modified aliphatic hydrocarbon solvents (e.g., perfluoroheptane, perfluorooctane), fluorine-modified aromatic hydrocarbon solvents (e.g., 1,3-bis(trifluoromethyl)benzene), fluorine-modified ether solvents (e.g., methyl perfluorobutyl ether, ethyl perfluorobutyl ether, perfluoro(2-butyltetra-hydrofuran)), fluorine-modified alkylamine solvents (e.g., perfluorotributylamine, perfluorotripentylamine), hydrocarbon solvents (petroleum benzine, toluene, xylene), and ketone solvents (e.g., acetone, methyl ethyl ketone, methyl isobutyl ketone). Of these, fluorine-modified solvents are preferred in terms of properties such as solvency and wettability, with 1,3-bis(trifluoromethyl)benzene, perfluoro(2-butyltetra-hydrofuran), perfluorotributylamine and ethyl perfluorobutyl ether being especially preferred.

Two or more of these solvents may be used in admixture, and it is preferable for the fluoropolyether-containing polymer-modified silane and partial (hydrolytic) condensates thereof to be uniformly dissolved therein. The optimal concentration of fluoropolyether-containing polymer-modified silane and partial (hydrolytic) condensates thereof dissolved in the solvent varies with the treatment method and should be an amount that is easily weighed. For direct application, the concentration is preferably 0.01 to 10 parts by weight, and especially 0.05 to 5 parts by weight, per 100 parts by weight of the combined amount of solvent and fluoropolyether-containing polymer-modified silane (and partial (hydrolytic) condensates thereof). For vapor deposition treatment, the concentration is preferably 1 to 100 parts by weight, and especially 3 to 30 parts by weight, per 100 parts by weight of the combined amount of solvent and fluoropolyether-containing polymer-modified silane (and partial (hydrolytic) condensates thereof).

The surface treating agent of the invention may be applied to a substrate by a commonly known method such as brush coating, dipping, spraying or vapor deposition. The method of heating used during vapor deposition treatment may be either resistance heating or electron beam heating, and is not particularly limited. The curing temperature varies with the curing method. For example, for direct application (e.g., brush coating, dipping, spraying), curing at a temperature of 25 to 200° C., and especially 25 to 80° C., for 30 minutes to 36 hours, and especially 1 to 24 hours, is preferred. For application by vapor deposition, a curing temperature in the range of 20 to 200° C. is desirable. Curing under humid conditions is also possible. The thickness of the cured film is suitably selected according to the type of substrate, but is generally from 0.1 to 100 nm, and especially from 1 to 20 nm. In the case of spray coating, diluting the surface treating agent beforehand in a fluorocarbon solvent to which some water has been added so as to effect hydrolysis, i.e., the formation of Si—OH groups, and then spraying the surface treating agent onto the substrate results in a rapid cure following application.

The substrate to be treated with the inventive surface treating agent is not particularly limited and may be made of any of various types of materials, such as paper, fabric, metals and oxides thereof, glass, plastic, ceramic or quartz. Use of the surface treating agent on $SiO_2$-treated glass or film is especially preferred.

Articles that may be treated with the surface treating agent of the invention include car navigation systems, mobile phones, digital cameras, digital video cameras, PDA's, portable audio players, car audio systems, game consoles, optical articles such as eyeglass lenses, camera lenses, lens filters and sunglasses, medical devices such as gastroscopes, photocopiers, personal computers, liquid-crystal displays, organic EL displays, plasma displays, touch panel displays, protective films and anti-reflective coatings. The inventive surface treating agent, because it prevents fingerprints and skin oils from being left on such articles and can also impart scuff and scratch resistance, is particularly useful as a water/oil-repelling layer on touch panel displays and anti-reflective films.

The surface treating agent of the invention is also useful as an anti-stain coating for sanitary fixtures such as bathtubs and sinks, a soil-resistant coating for window glass, reinforced glass, headlight covers and like in automobiles, railway cars and aircraft, a water/oil-repellent coating for building materials used in outside walls, a water/oil repellent coating for building materials used in kitchens, a coating to keep stains, stickers/posters and graffiti off telephone booths, a coating to keep fingerprints off works of art, a coating to keep fingerprints off compact disks and DVDs, a mold lubricant, a paint additive, a resin modifier, a flow modifier or dispersion property modifier for inert fillers, and a lubricity enhancer for tapes and films.

EXAMPLES

Working Examples of the invention and Comparative Examples are given below by way of illustration and not by way of limitation.

Example 1

The following were mixed together in a reactor: 300 g ($8.3 \times 10^{-2}$ mol) of the compound of formula (A) below

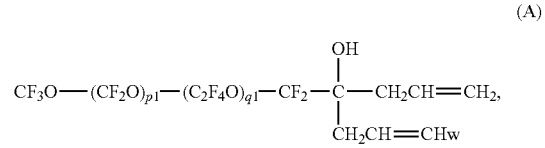

$$CF_3O\text{---}(CF_2O)_{p1}\text{---}(C_2F_4O)_{q1}\text{---}CF_2\text{---}\underset{\underset{CH_2CH=CHw}{|}}{\overset{\overset{OH}{|}}{C}}\text{---}CH_2CH=CH_2,$$

$$p1{:}q1 = 47{:}53, p1 + q1 \approx 43$$

50 g ($4.2 \times 10^{-1}$ mol) of allyl bromide, and 0.6 g ($1.7 \times 10^{-3}$ mol) of tetrabutylammonium iodide. Next, 23 g ($4.2 \times 10^{-1}$ mol) of potassium hydroxide was added, following which the mixture was heated 6 hours at 70° C. After the completion of heating, the system was cooled to room temperature and an aqueous hydrochloric acid solution was added dropwise. The fluorocarbon compound layer on the bottom was recovered by a separator operation and washed with acetone. The fluorocarbon compound layer on the bottom after washing was again recovered and the remaining solvent was driven off by distillation under reduced pressure.

The above operations were again carried out, giving 270 g of the fluoropolyether-containing polymer of formula (B) below.

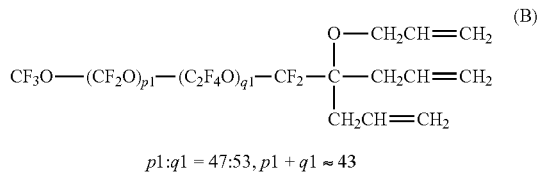

$p1:q1 = 47:53, p1 + q1 \approx 43$

¹H-NMR

δ 2.4-2.6 (C—C$\underline{H}_2$CH=CH$_2$) 4H

δ 4.0-4.1 (O—C$\underline{H}_2$CH=CH$_2$) 2H

δ 4.9-5.2 (—CH$_2$CH=C$\underline{H}_2$) 6H

δ 5.7-5.9 (C—CH$_2$C$\underline{H}$=CH$_2$) 3H

The following were mixed together in a reactor: 200 g ($5.5 \times 10^{-2}$ mol) of the compound of formula (B) obtained above

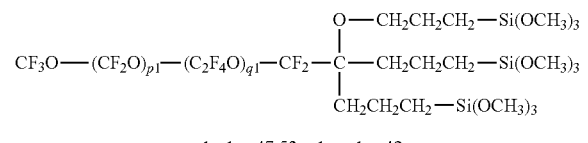

$p1:q1 = 47:53, p1 + q1 \approx 43$ 200 g of 1,3-bis(trifluoromethyl)benzene, 40 g ($3.3 \times 10^{-1}$ mol) of trimethoxysilane, and $2.0 \times 10^{-1}$ g of a toluene solution of chloroplatinic acid/vinylsiloxane complex (containing $6.0 \times 10^{-7}$ mol of Pt), and the mixture was aged 24 hours at 80° C. The solvent and unreacted reagents were subsequently removed by distillation under reduced pressure, giving 210 g of a liquid product.

The resulting compound was confirmed by NMR analysis to have the structure shown in formula (C) below.

(C)

CF$_3$O—(CF$_2$O)$_{p1}$—(C$_2$F$_4$O)$_{q1}$—CF$_2$—C(O—CH$_2$CH$_2$CH$_2$—Si(OCH$_3$)$_3$)(CH$_2$CH$_2$CH$_2$—Si(OCH$_3$)$_3$)—CH$_2$CH$_2$CH$_2$—Si(OCH$_3$)$_3$ $p1:q1 = 47:53, p1 + q1 \approx 43$

¹H-NMR

δ 0.5-0.7 (—CH$_2$CH$_2$C$\underline{H}_2$—Si) 6H

δ 1.4-1.9 (—C$\underline{H}_2$C$\underline{H}_2$CH$_2$—Si) 12H

δ 3.3-3.7 (—Si(OC$\underline{H}_3$)$_3$) 27H

Example 2

The following were mixed together in a reactor: 100 g of 1,3-bis(trifluoromethyl)benzene, 0.028 g ($5.4 \times 10^{-4}$ mol) of tris(pentafluorophenyl)borane, and 100 g ($2.7 \times 10^{-2}$ mol) of the compound of formula (A) below.

$p1:q1 = 47:53, p1 + q1 \approx 43$

Next, 3.8 g ($3.8 \times 10^{-2}$ mol) of dimethylallylsilane was gradually added dropwise, after which the mixture was heated 1 hour at 25° C. This was followed by the dropwise addition of water, subsequent to which the fluorocarbon compound layer on the bottom was recovered by a separatory operation and washed with acetone. The fluorocarbon compound layer on the bottom after washing was again recovered and the remaining solvent was driven off by distillation under reduced pressure, giving 95 g of the fluoropolyether-containing polymer of formula (D) below.

$p1:q1 = 47:53, p1 + q1 \approx 43$

¹H-NMR

δ 0-0.2 (—Si—C$\underline{H}_3$)$_2$—) 6H

δ 1.5-1.7 (—Si—CH$_3$)$_2$—C$\underline{H}_2$—) 2H

δ 2.3-2.6 (—C$\underline{H}_2$CH=CH$_2$) 4H

δ 4.7-5.2 (—CH$_2$CH=C$\underline{H}_2$) 6H

δ 5.7-5.9 (—CH$_2$C$\underline{H}$=CH$_2$) 3H

The following were mixed together in a reactor: 90 g ($2.4 \times 10^{-2}$ mol) of the compound of formula (D) obtained above

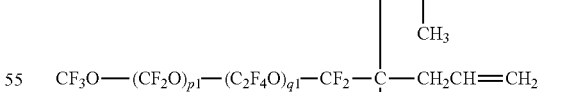

$p1:q1 = 47:53, p1 + q1 \approx 43$ 90 g of 1,3-bis(trifluoromethyl)benzene, 18 g ($1.5 \times 10^{-1}$ mol) of trimethoxysilane, and $9.5 \times 10^{-1}$ g of a toluene solution of chloroplatinic acid/vinylsiloxane complex (containing $2.9 \times 10^{-7}$ mol of Pt), and the mixture was aged 24 hours at 80° C. The solvent and unreacted reagents were then removed by distillation under reduced pressure, giving 95 g of a liquid product.

The resulting compound was confirmed by NMR analysis to have the structure shown in formula (E) below.

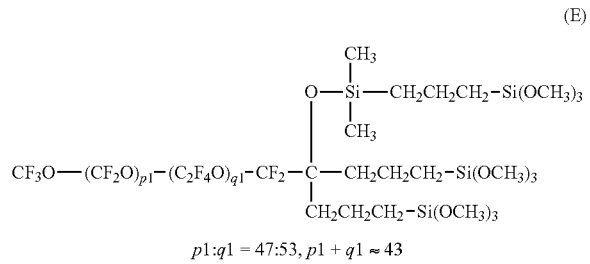

(E)

$p1:q1 = 47:53, p1 + q1 \approx 43$ $^1$H-NMR
δ 0-0.3 (—Si—C$\underline{H}_3$)$_2$—) 6H
δ 0.5-0.8 (—Si—CH$_3$)$_2$—C$\underline{H}_2$CH$_2$C$\underline{H}_2$—Si, C—CH$_2$CH$_2$C$\underline{H}_2$—Si) 8H
δ 1.3-1.9 (—Si—CH$_3$)$_2$—CH$_2$C$\underline{H}_2$CH$_2$—Si, C—CH$_2$C$\underline{H}_2$CH$_2$—Si) 10H
δ 3.3-3.7 (—Si(OC$\underline{H}_3$)$_3$) 27H Example 3

The following were mixed together in a reactor: 100 g of 1,3-bis(trifluoromethyl)benzene, 0.028 g (5.4×10$^{-4}$ mol) of tris(pentafluorophenyl)borane, and 100 g (2.7×10$^{-2}$ mol) of the compound of formula (A) below.

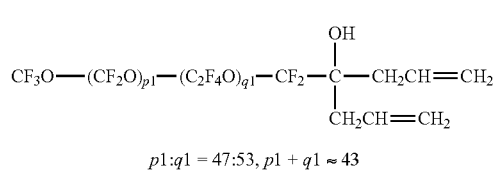

(A)

$p1:q1 = 47:53, p1 + q1 \approx 43$

Next, 6.5 g (5.4×10$^{-2}$ mol) of dimethylvinylsilane was gradually added dropwise, after which the mixture was heated 1 hour at 25° C. This was followed by the dropwise addition of water, subsequent to which the fluorocarbon compound layer on the bottom was recovered by a separatory operation and washed with acetone. The fluorocarbon compound layer on the bottom after washing was again recovered and the remaining solvent was driven off by distillation under reduced pressure, giving 99 g of the fluoropolyether-containing polymer of formula (F) below.

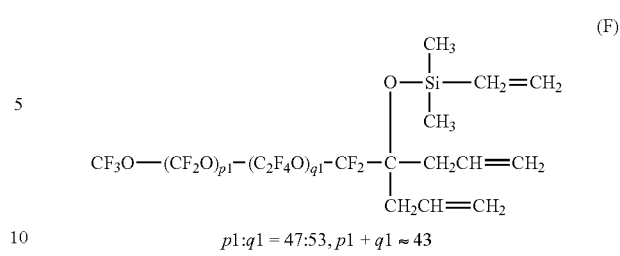

(F)

$p1:q1 = 47:53, p1 + q1 \approx 43$ $^1$H-NMR
δ 0-0.2 (—Si—C$\underline{H}_3$)$_2$—) 6H
δ 2.4-2.5 (—C$\underline{H}_2$CH=CH$_2$) 4H
δ 4.7-5.2 (—CH$_2$CH=C$\underline{H}_2$) 4H
δ 5.6-6.2 (—CH$_2$C$\underline{H}$=CH$_2$, —Si—(CH$_3$)$_2$—C$\underline{H}$=CH$_2$) 5H The following were mixed together in a reactor: 90 g (2.4×10$^{-2}$ mol) of the compound of formula (F) obtained above

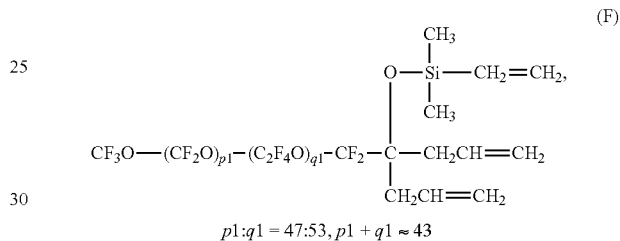

(F)

$p1:q1 = 47:53, p1 + q1 \approx 43$ 90 g of 1,3-bis(trifluoromethyl)benzene, 18 g (1.5×10$^{-1}$ mol) of trimethoxysilane, and 9.5×10$^{-1}$ g of a toluene solution of chloroplatinic acid/vinylsiloxane complex (containing 2.9×10$^{-7}$ mol of Pt), and the mixture was aged 24 hours at 80° C. The solvent and unreacted reagents were then removed by distillation under reduced pressure, giving 97 g of a liquid product.

The resulting compound was confirmed by NMR analysis to have the structure shown in formula (G) below.

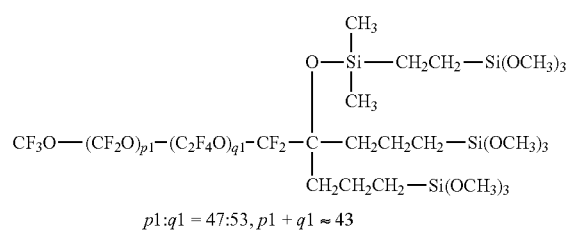

(G)

$p1:q1 = 47:53, p1 + q1 \approx 43$ $^1$H-NMR
δ 0-0.3 (—Si—C$\underline{H}_3$)$_2$—) 6H
δ 0.5-0.8 (—Si—CH$_3$)$_2$—C$\underline{H}_2$CH$_2$—Si, C—CH$_2$C$\underline{H}_2$—Si) 8H
δ 1.4-2.0 (C—C$\underline{H}_2$C$\underline{H}_2$CH$_2$—Si) 8H
δ 3.4-3.7 (—Si(OC$\underline{H}_3$)$_3$) 27H Example 4

The following were mixed together in a reactor: 100 g of 1,3-bis(trifluoromethyl)benzene, 0.028 g (5.4×10$^{-4}$ mol) of tris(pentafluorophenyl)borane, and 100 g (2.7×10$^{-2}$ mol) of the compound of formula (A) below.

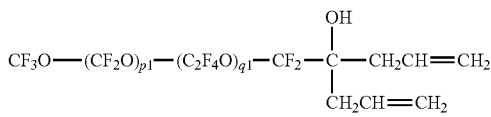

$p1:q1 = 47:53, p1 + q1 \approx 43$

Next, 6.4 g (4.1×10⁻²  mol) of vinyltetramethyldisiloxane was gradually added dropwise, after which the mixture was heated 1 hour at 25° C. This was followed by the dropwise addition of water, subsequent to which the fluorocarbon compound layer on the bottom was recovered by a reparatory operation and washed with acetone. The fluorocarbon compound layer on the bottom after washing was again recovered and the remaining solvent was driven off by distillation under reduced pressure, giving 103 g of the fluoropolyether-containing polymer of formula (H) below.

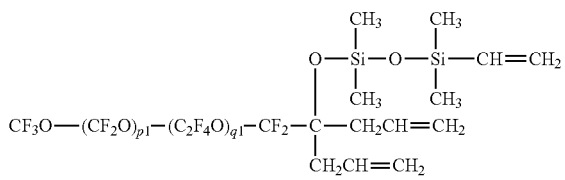

$p1:q1 = 47:53, p1 + q1 \approx 43$

¹H-NMR
δ 0-0.2 (—Si—C$\underline{H}_3$)₂—) 12H
δ 2.3-2.5 (—C$\underline{H}_2$CH=CH₂) 4H
δ 4.8-5.0 (—CH₂CH=C$\underline{H}_2$) 4H
δ 5.5-6.1 (—CH₂C$\underline{H}$=CH₂, —Si—(CH₃)₂—C$\underline{H}$=C$\underline{H}_2$) 5H The following were mixed together in a reactor: 90 g (2.4×10⁻² mol) of the compound of formula (H) obtained above

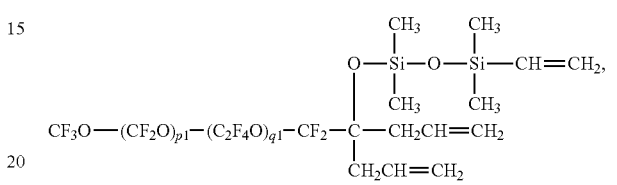

$p1:q1 = 47:53, p1 + q1 \approx 43$ 90 g of 1,3-bis(trifluoromethyl)benzene, 18 g (1.5×10⁻¹ mol) of trimethoxysilane, and 9.5×10⁻¹ g of a toluene solution of chloroplatinic acid/vinylsiloxane complex (containing 2.9×10⁻⁷ mol of Pt), and the mixture was aged 24 hours at 80° C. The solvent and unreacted reagents were then removed by distillation under reduced pressure, giving 96 g of a liquid product.

The resulting compound was confirmed by NMR analysis to have the structure shown in formula (1) below.

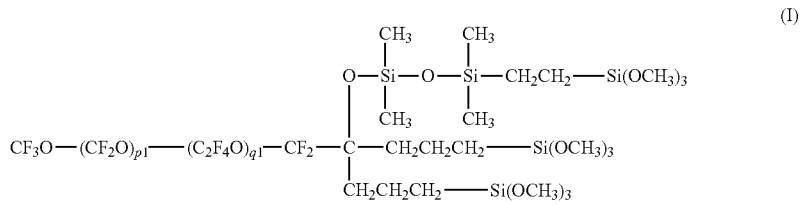

$p1:q1 = 47:53, p1 + q1 \approx 43$

¹H-NMR
δ 0-0.3 (—Si—C$\underline{H}_3$)₂—) 12H
δ 0.5-0.8 (—Si—CH₃)₂—C$\underline{H}_2$C$\underline{H}_2$—Si, C—CH₂CH₂C$\underline{H}_2$—Si) 8H
δ 1.4-1.9 (C—C$\underline{H}_2$C$\underline{H}_2$CH₂—Si) 8H
δ 3.3-3.7 (—Si(OC$\underline{H}_3$)₃) 27H Example 5

The following were mixed together in a reactor: 100 g (5.0×10⁻² mol) of the compound of formula (X) below

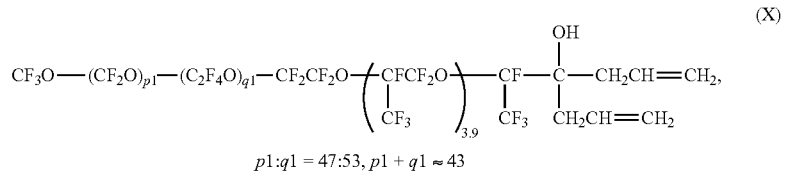

$p1:q1 = 47:53, p1 + q1 \approx 43$ 30 g ($2.5\times10^{-1}$ mol) of allyl bromide and 0.36 g ($1.0\times10^{-2}$ mol) of tetrabutylammonium iodide. Next, 14 g ($2.5\times10^{-1}$ mol) of potassium hydroxide was added, after which the mixture was heated 6 hours at 70° C. Following the completion of heating, the system was cooled to room temperature and an aqueous solution of hydrochloric acid was added dropwise. The fluorocarbon compound layer on the bottom was recovered by a reparatory operation and washed with acetone. The fluorocarbon compound layer on the bottom after washing was again recovered and the remaining solvent was driven off by distillation under reduced pressure, giving 98 g of the fluoropolyether-containing polymer of formula (Y) below.

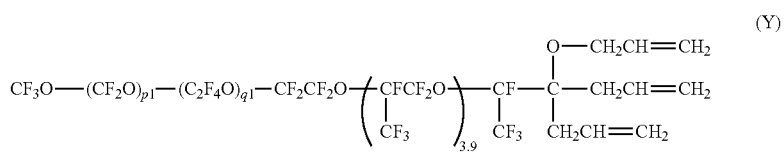

$p1:q1 = 47:53, p1 + q1 \approx 43$ $^1$H-NMR
δ 2.1-2.5 (C—C$\underline{H}_2$CH=CH$_2$) 4H
δ 4.0-4.1 (O—C$\underline{H}_2$CH=CH$_2$) 2H
δ 4.7-5.1 (—CH$_2$CH=C$\underline{H}_2$) 6H
δ 5.5-5.8 (—CH$_2$C$\underline{H}$=CH$_2$) 3H The following were mixed together in a reactor: 90 g ($2.3\times10^{-2}$ mol) of the compound of formula (Y) obtained above

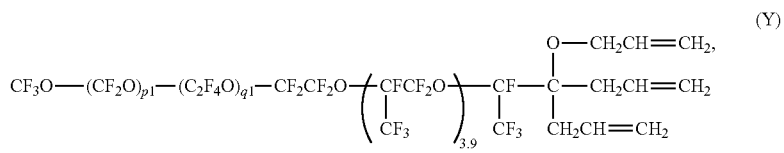

$p1:q1 = 47:53, p1 + q1 \approx 43$ 90 g of 1,3-bis(trifluoromethyl)benzene, 17 g ($1.4\times10^{-1}$ mol) of trimethoxysilane, and $9.1\times10^{-1}$ g of a toluene solution of chloroplatinic acid/vinylsiloxane complex (containing $2.8\times10^{-7}$ mol of Pt), and the mixture was aged 24 hours at 80° C. The solvent and unreacted reagents were then removed by distillation under reduced pressure, giving 95 g of a liquid product.

The resulting compound was confirmed by NMR analysis to have the structure shown in formula (Z) below.

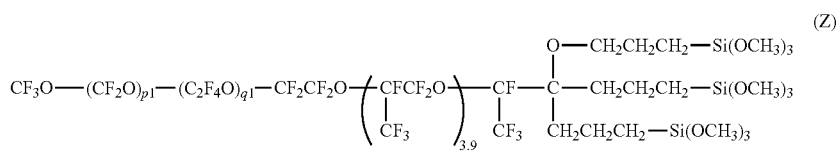

$p1:q1 = 47:53, p1 + q1 \approx 43$ $^1$H-NMR
δ 0.4-0.7 (—CH$_2$CH$_2$C$\underline{H}_2$—Si) 6H
δ 1.4-1.8 (—C$\underline{H}_2$C$\underline{H}_2$CH$_2$—Si) 12H
δ 3.2-3.6 (—Si(OC$\underline{H}_3$)$_3$) 27H Example 6

The following were mixed together in a reactor: 300 g ($1.5 \times 10^{-1}$ mol) of the compound of formula (J) below

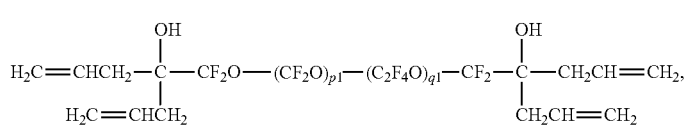
(J)

$p1:q1 = 47:53, p1 + q1 \approx 43$ 91 g ($7.5 \times 10^{-1}$ mol) of allyl bromide and 1.1 g ($3.0 \times 10^{-3}$ mol) of tetrabutylammonium iodide. Next, 42 g ($7.5 \times 10^{-1}$ mol) of potassium hydroxide was added, after which the mixture was heated 6 hours at 70° C. Following the completion of heating, the system was cooled to room temperature and an aqueous solution of hydrochloric acid was added dropwise. The fluorocarbon compound layer on the bottom was recovered by a separatory operation and washed with acetone. The fluorocarbon compound layer on the bottom after washing was again recovered and the remaining solvent was driven off by distillation under reduced pressure, giving 287 g of the fluoropolyether group-containing polymer of formula (K) below.

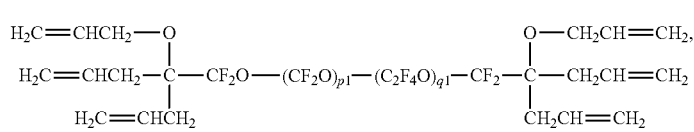
(K)

$p1:q1 = 47:53, p1 + q1 \approx 43$ $^1$H-NMR
δ 2.4-2.6 (C—C$\underline{H}_2$CH=CH$_2$) 8H
δ 4.0-4.1 (O—C$\underline{H}_2$CH=CH$_2$) 4H
δ 4.9-5.2 (—CH$_2$CH=C$\underline{H}_2$) 12H
δ 5.7-5.9 (—CH$_2$C$\underline{H}$=CH$_2$) 6H The following were mixed together in a reactor: 200 g ($1.0 \times 10^{-1}$ mol) of the compound of formula (K) obtained above

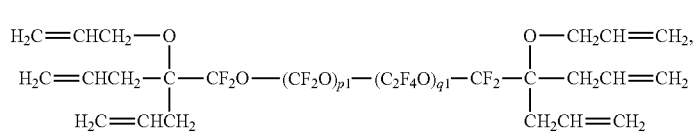
(K)

$p1:q1 = 47:53, p1 + q1 \approx 43$ 200 g of 1,3-bis(trifluoromethyl)benzene, 73 g ($6.0 \times 10^{-1}$ mol) of trimethoxysilane, and $3.6 \times 10^{-1}$ g of a toluene solution of chloroplatinic acid/vinylsiloxane complex (containing $1.1 \times 10^{-6}$ mol of Pt), and the mixture was aged 24 hours at 80° C. The solvent and unreacted reagents were then removed by distillation under reduced pressure, giving 206 g of a liquid product.

The resulting compound was confirmed by NMR analysis to have the structure shown in formula (L) below.

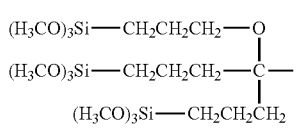 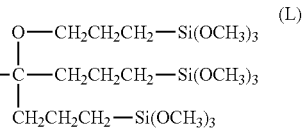 (L)

$p1:q1 = 47:53, p1 + q1 \approx 43$ $^1$H-NMR
δ 0.5-0.7 (—CH$_2$CH$_2$C$\underline{H}_2$—Si) 12H
δ 1.4-1.9 (—C$\underline{H}_2$C$\underline{H}_2$CH$_2$—Si) 24H
δ 3.3-3.7 (—Si(OC$\underline{H}_3$)$_3$) 54H The following polymers were used as Comparative Examples.

Comparative Example 1

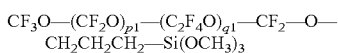 (M)

p1:q1=47:53, p1+q1≈43

Comparative Example 2

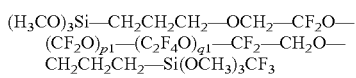 (N)

p1:q1=47:53, p1+q1≈43

Comparative Example 3

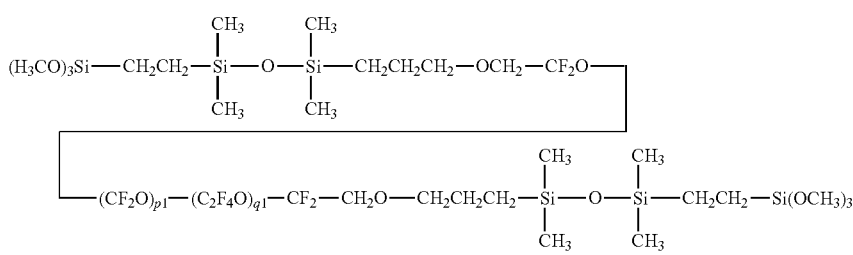 (O)

$p1:q1 = 47:53, p1 + q1 \approx 43$

Preparation of Surface Treating Agent and Formation of Cured Film

The fluoropolyether-containing polymer-modified silanes obtained in Examples 1 to 6 and the polymers of Comparative Examples 1 to 3 were dissolved to a concentration of 0.1 wt % in Novec 7200 (ethyl perfluorobutyl ether, from the 3M Co.), thereby preparing surface treating agents. The respective surface treating agents were spray coated (treatment conditions: operating speed, 360 mm/s; feed pitch, 12 mm) onto glass (Gorilla® Glass 3, from Corning Inc.) to a coating weight of $8.5\times10^{-3}$/m$^2$ and cured 24 hours in a 25° C., 40% humidity environment, forming a cured film having a thickness of 8 nm.

Evaluation of Water/Oil Repellency
Evaluation of Initial Water/Oil Repellency:

The glass specimens having a cured film formed thereon that were produced above were tested by using a DropMaster contact angle meter (Kyowa Interface Science Co., Ltd.) to measure the contact angle of the cured film with water (water repellency) under the following conditions: droplet size, 2 µL; temperature, 25° C.; humidity, 40%. The results (initial contact angle with water) are shown in Table 1.

Good water repellency was initially exhibited in both the Examples of the invention and the Comparative Examples.

Evaluation of Abrasion Resistance:

The glass specimens having a cured film formed thereon that were produced above were tested by measuring the contact angle of the cured film with water in the same way as described above after the cured film had been rubbed 3,000 times under the conditions shown below using a rubbing tester (Shinto Scientific Co., Ltd.), based on which the abrasion resistance was evaluated. The test environment conditions were 25° C. and 40% humidity. The results (contact angle with water following abrasion) are shown in Table 1.

Abrasion Resistance to Steel Wool:
Steel wool: BONSTAR #0000 (Nihon Steel Wool Co., Ltd.)
Surface area of contact: 10 mm diameter
Stroke (one way): 30 cm
Speed of travel, 1,800/min
Load: 1 kg/cm$^2$ The compounds of Examples 1 to 6 have from three to six reactive functional groups on the molecule, which is more than the compounds of Comparative Examples 1 to 3. As a result, even after being rubbed with steel wool, cured films of the surface treating agents containing the compounds of Examples 1 to 6 had a contact angle with water of more than 100° and thus exhibited a good abrasion resistance.

TABLE 1

Cured films obtained by 24 hours of curing in a 25° C., 40% humidity environment.

| | Initial angle of contact with water (°) | Angle of contact with water after rubbing (°) |
|---|---|---|
| Example 1 | 117 | 111 |
| Example 2 | 117 | 109 |
| Example 3 | 116 | 108 |
| Example 4 | 117 | 109 |
| Example 5 | 114 | 106 |
| Example 6 | 111 | 104 |

TABLE 1-continued

Cured films obtained by 24 hours of curing in a 25° C., 40% humidity environment.

| | Initial angle of contact with water (°) | Angle of contact with water after rubbing (°) |
|---|---|---|
| Comparative Example 1 | 115 | 64 |
| Comparative Example 2 | 110 | 40 |
| Comparative Example 3 | 109 | 38 |

Japanese Patent Application No. 2015-085708 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluoropolyether-containing polymer-modified silane having general formula (1)

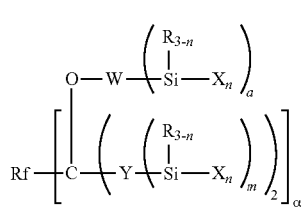

wherein Rf is a monovalent fluorooxyalkyl or divalent fluorooxyalkylene-containing polymer residue, Y is at least one of divalent to tetravalent groups being selected from the following formulae:

—CH$_2$CH$_2$CH$_2$—,
—CH$_2$CH$_2$CH$_2$CH$_2$—,
—CH$_2$CH$_2$CH$_2$CH$_2$CH$_2$—,
—CH$_2$CH$_2$CH$_2$CH$_2$CH$_2$CH$_2$—,

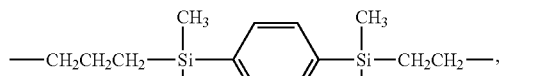

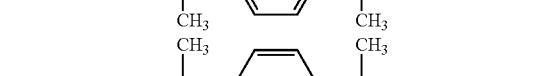

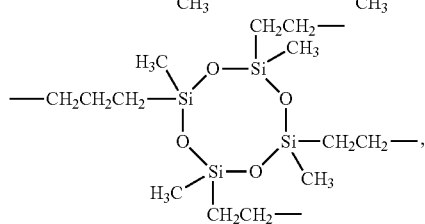

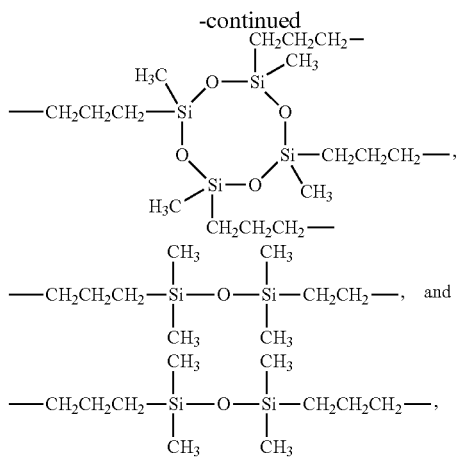

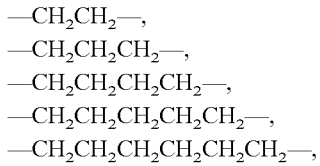

W is at least one of divalent to tetravalent groups being selected from the following formulae:

—CH$_2$CH$_2$—,
—CH$_2$CH$_2$CH$_2$—,
—CH$_2$CH$_2$CH$_2$CH$_2$—,
—CH$_2$CH$_2$CH$_2$CH$_2$CH$_2$—,
—CH$_2$CH$_2$CH$_2$CH$_2$CH$_2$CH$_2$—,

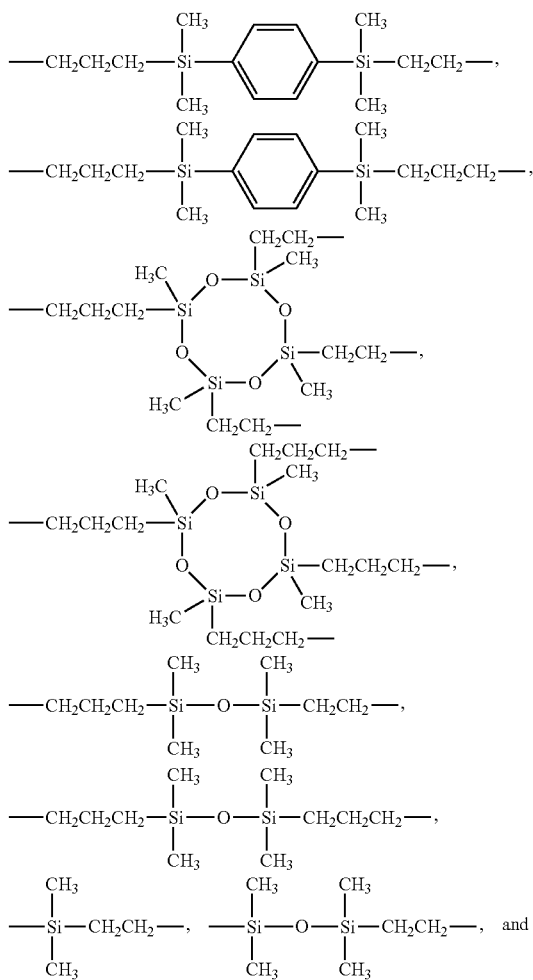

-continued

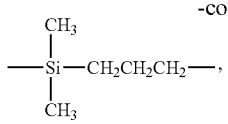

R is independently an alkyl group of 1 to 4 carbon atoms or a phenyl group, each X is independently selected from the group consisting of hydroxyl, alkoxy groups of 1 to 10 carbon atoms, alkoxyalkoxy groups of 2 to 10 carbon atoms, acyloxy groups of 1 to 10 carbon atoms, alkenyloxy groups of 2 to 10 carbon atoms, and halogen groups, n is an integer from 1 to 3, a is an integer from 1 to 3, m is an integer from 1 to 3, and $\alpha$ is 1 or 2.

2. The polymer-modified silane of claim 1, wherein $\alpha$ in formula (1) is 1 and Rf is a moiety of general formula (2)

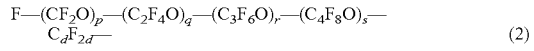

wherein p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ unit may be linear or branched.

3. The polymer-modified silane of claim 1, wherein $\alpha$ in formula (1) is 2 and Rf is a moiety of general formula (3)

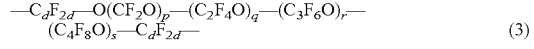

wherein p, q, r and s are each an integer from 0 to 200, the sum p+q+r+s=3 to 200, each recurring unit may be linear or branched, individual recurring units may be randomly arranged, d is an integer from 1 to 3, and the $C_dF_{2d}$ units may be linear or branched.

4. The polymer-modified silane of claim 1 which has any one of the following formulas:

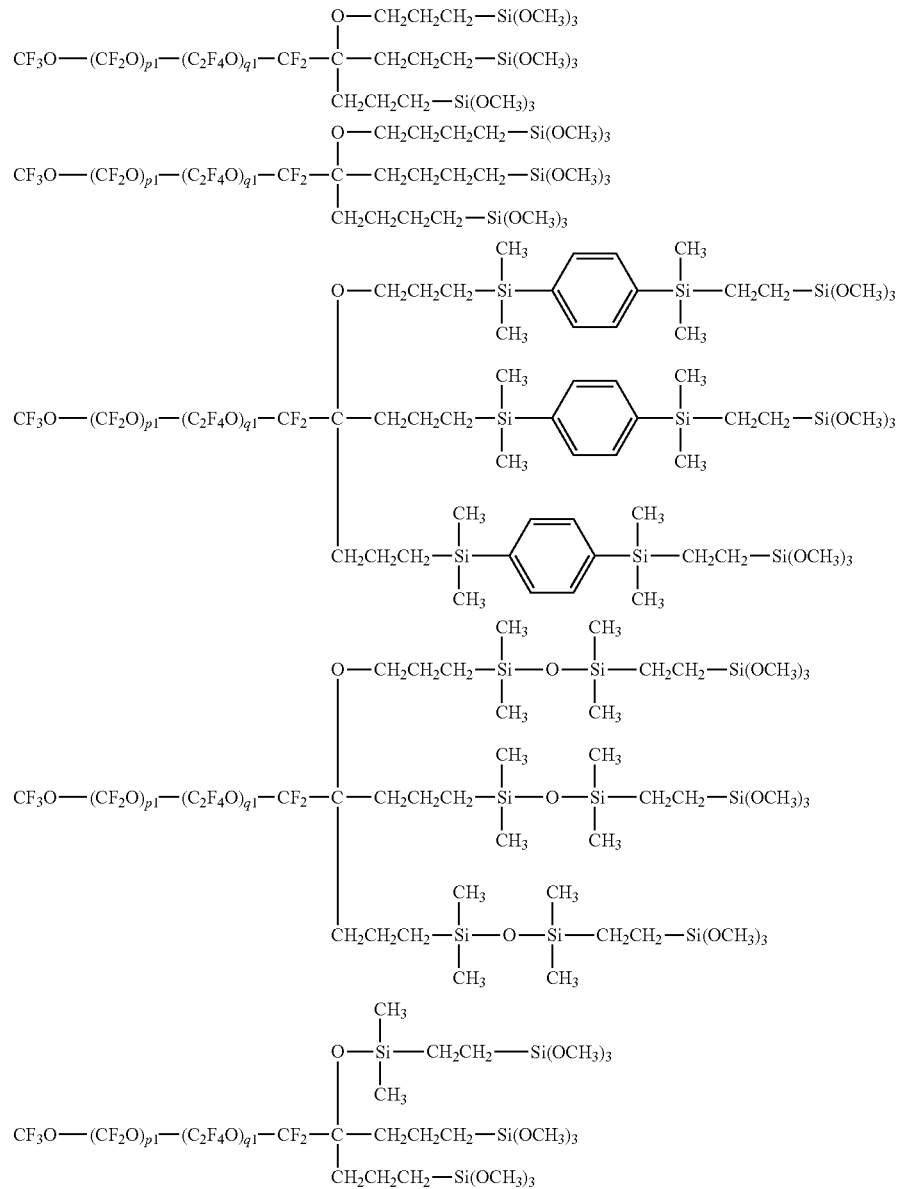

-continued
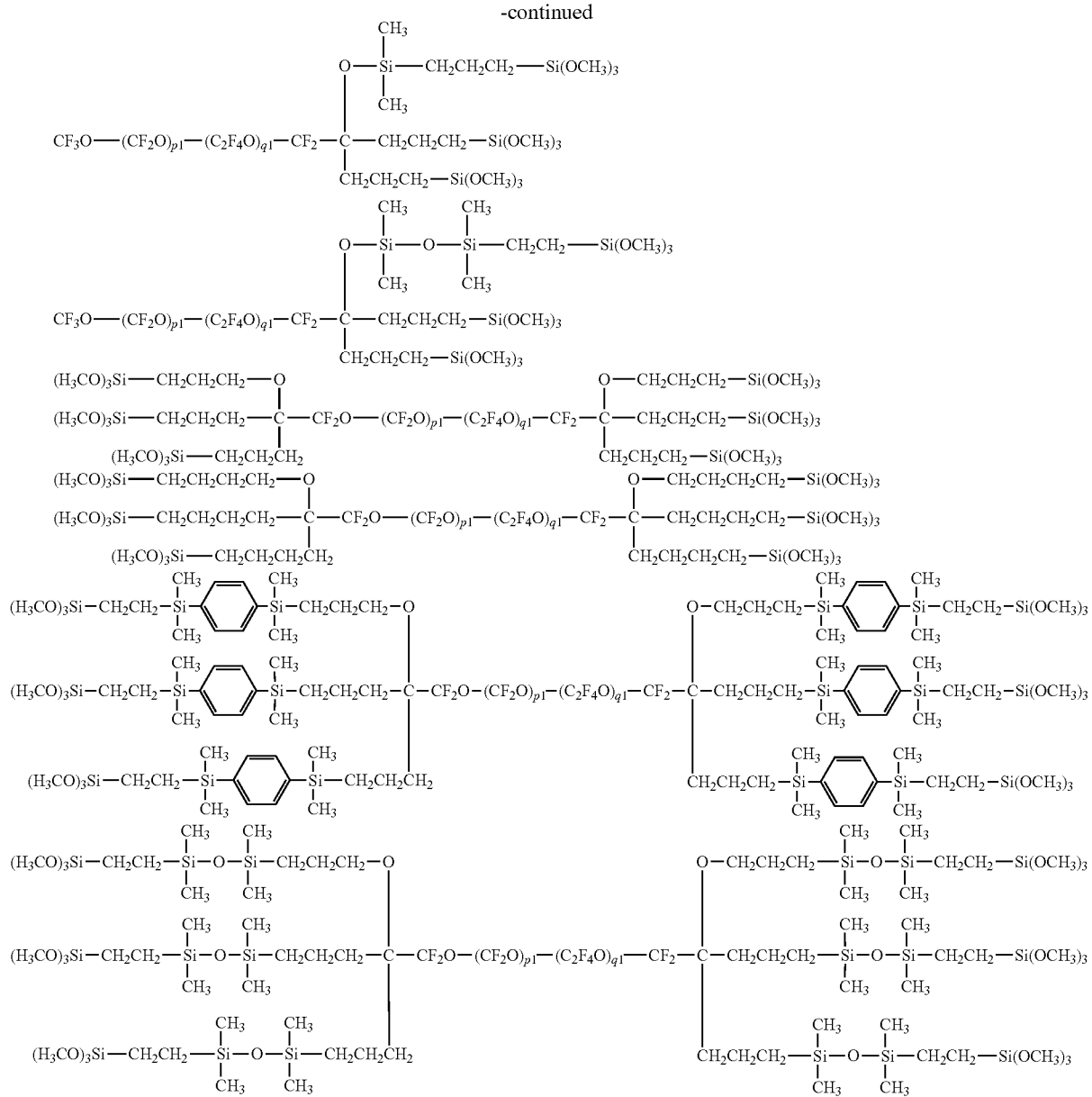
wherein p1 is an integer from 5 to 100, q1 is an integer from 5 to 100, and the sum p1+q1 is an integer from 10 to 105.
5. A surface treating agent comprising the polymer-modified silane of claim 1 and/or a partial (hydrolytic) condensate thereof.
6. An article surface-treated with the surface treating agent of claim 5.
* * * * *